(12) United States Patent
Dewa

(10) Patent No.: US 10,939,064 B2
(45) Date of Patent: *Mar. 2, 2021

(54) IMAGE DISPLAY CONTROL APPARATUS, TRANSMISSION APPARATUS, IMAGE DISPLAY CONTROL METHOD, AND PROGRAM

(71) Applicant: SONY CORPORATION, Tokyo (JP)

(72) Inventor: Yoshiharu Dewa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,527

(22) Filed: Jun. 5, 2018

(65) Prior Publication Data
US 2018/0288357 A1   Oct. 4, 2018

Related U.S. Application Data

(63) Continuation of application No. 15/510,727, filed as application No. PCT/JP2015/072350 on Aug. 6, 2015, now Pat. No. 10,021,338.

(30) Foreign Application Priority Data

Sep. 22, 2014  (JP) .............................. JP2014-192181

(51) Int. Cl.
*G09G 5/00* (2006.01)
*G09G 5/02* (2006.01)
(Continued)

(52) U.S. Cl.
CPC ................ *H04N 5/58* (2013.01); *G09G 5/00* (2013.01); *G09G 5/02* (2013.01); *G09G 5/10* (2013.01);
(Continued)

(58) Field of Classification Search
CPC ........................... H04N 5/58; G09G 2360/144
See application file for complete search history.

(56) References Cited

U.S. PATENT DOCUMENTS 7,314,283 B2 * 1/2008 Tsukada ............. H04N 5/44513
345/590
7,744,216 B1   6/2010 Uhlhorn
(Continued)

FOREIGN PATENT DOCUMENTS

CN    102770905 A    11/2012
JP    6-332439 A    12/1994
(Continued)

OTHER PUBLICATIONS

Combined Chinese Office Action and Search Report dated Oct. 23, 2018 in corresponding Chinese Patent Application No. 201580049310.5 (with English Translation), citing document AO therein, 16 pages.
(Continued)

*Primary Examiner* — Paulos M Natnael
(74) *Attorney, Agent, or Firm* — Oblon, McClelland, Maier & Neustadt, L.L.P.

(57) ABSTRACT

To provide an apparatus and method for executing signal conversion processing according to environmental light in a content unit, a scene unit, or a frame unit to generate an output image. Provided is an image display control apparatus including a data processing unit that controls image signals to be output to a display unit, the data processing unit being configured to execute a display control application supporting a content to be displayed on the display unit to generate output image signals. The data processing unit inputs sensor detection signals from a sensor that acquires environmental light information in a periphery of the display unit, and applies the sensor detection signals and generates output image signals by carrying out signal conversion processing in which different signal conversion algorithms (Continued)

are applied to original input image signals of the content in a content unit, a unit of scenes configuring a content, or a frame unit.

18 Claims, 19 Drawing Sheets

(51) Int. Cl.
    *H04N 9/73* (2006.01)
    *H04N 5/58* (2006.01)
    *G09G 5/10* (2006.01)
    *H04N 9/69* (2006.01)

(52) U.S. Cl.
    CPC ............... *H04N 9/69* (2013.01); *H04N 9/73* (2013.01); *G09G 2320/0666* (2013.01); *G09G 2340/06* (2013.01); *G09G 2360/144* (2013.01); *G09G 2370/04* (2013.01)

(56) References Cited

U.S. PATENT DOCUMENTS

| | | | | |
|---|---|---|---|---|
| 8,169,504 | B2* | 5/2012 | Kiuchi | G06T 5/40 |
| | | | | 348/229.1 |
| 8,222,837 | B2* | 7/2012 | Galeazzi | H04N 9/73 |
| | | | | 315/299 |
| 8,296,803 | B2* | 10/2012 | Yamaoka | H04N 5/44543 |
| | | | | 725/143 |
| 8,537,174 | B2* | 9/2013 | Capener | G09G 5/10 |
| | | | | 345/589 |
| 9,436,413 | B2* | 9/2016 | Mizoguchi | G06F 3/12 |
| 10,021,338 | B2* | 7/2018 | Dewa | G09G 5/00 |
| 10,021,361 | B2* | 7/2018 | Fujiwara | H04N 9/735 |
| 2003/0117413 | A1* | 6/2003 | Matsuda | G09G 5/04 |
| | | | | 345/589 |
| 2003/0202121 | A1 | 10/2003 | Huh et al. | |
| 2010/0169927 | A1* | 7/2010 | Yamaoka | H04N 5/44543 |
| | | | | 725/46 |
| 2011/0058065 | A1* | 3/2011 | Kiuchi | G06T 5/40 |
| | | | | 348/229.1 |
| 2011/0080421 | A1* | 4/2011 | Capener | G09G 5/10 |
| | | | | 345/589 |
| 2011/0205259 | A1* | 8/2011 | Hagood, IV | G09G 3/2003 |
| | | | | 345/690 |
| 2011/0292061 | A1 | 12/2011 | Mineo et al. | |
| 2012/0288197 | A1 | 11/2012 | Adachi | |
| 2013/0163860 | A1* | 6/2013 | Suzuki | G06K 9/00718 |
| | | | | 382/159 |
| 2013/0183022 | A1* | 7/2013 | Suzuki | G06K 9/00718 |
| | | | | 386/241 |
| 2015/0379382 | A1* | 12/2015 | Mizoguchi | G06F 3/12 |
| | | | | 358/1.15 |
| 2017/0013242 | A1* | 1/2017 | Fujiwara | H04N 9/735 |
| 2017/0013243 | A1* | 1/2017 | Fujiwara | H04N 9/735 |
| 2017/0192504 | A1 | 7/2017 | Simmons | |
| 2018/0288357 | A1* | 10/2018 | Dewa | G09G 5/00 |

FOREIGN PATENT DOCUMENTS

| | | |
|---|---|---|
| JP | 2003-324756 A | 11/2003 |
| JP | 2005-210325 A | 8/2005 |
| JP | 2007-57599 A | 3/2007 |
| JP | 2009-229952 A | 10/2009 |
| JP | 2011-250356 A | 12/2011 |
| WO | WO 2011/103377 A1 | 8/2011 |

OTHER PUBLICATIONS

Japanese Office Action dated Sep. 10, 2019 in Japanese Patent Application No. 2016-550020, citing documents AO through AT therein, 4 pages.

* cited by examiner

Image control application configuration example (1)

| Scene identifier | Reproduction time | ID of signal conversion algorithm to be applied |
|---|---|---|
| (Scene 1) | begin="00:00:00.000" end="00:03:05.034" | 001 |
| (Scene 2) | begin="00:03:05.034" end="00:08:15.221" | 003 |
| .. | .. | .. |
| (Scene n) | begin="00:45:12.022" end="00:52:15.231" | 001 |

FIG.5

| Scene identifier | Scene-supporting signal conversion algorithm | Parameters determined based on sensor detection values (YUV)sns |
|---|---|---|
| (Scene 1) | Yout = a × (Yin) + b<br>Uout = c × (Uin) + d<br>Vout = e × (Vin) + f | $a = F_{11}(Ysns)$, $b = F_{12}(Ysns)$<br>$c = F_{13}(Usns)$, $d = F_{14}(Usns)$<br>$e = F_{15}(Vsns)$, $f = F_{16}(Vsns)$ |
| (Scene 2) | Yout = a × (Yin) + b<br>Uout = c × (Uin) + d(Vin)<br>Vout = e × (Vin) + f(Uin) | $a = F_{21}(Ysns)$, $b = F_{22}(Ysns)$<br>$c = F_{23}(Usns)$, $d = F_{24}(Vsns)$<br>$e = F_{25}(Vsns)$, $f = F_{26}(Usns)$ |
| ... | ... | ... |

FIG.7

Image control application configuration example (2)

| Scene identifier | Reproduction time | ID of signal conversion algorithm to be applied | | |
|---|---|---|---|---|
| | | Y | U | V |
| (Scene 1) | begin="00:00:00.000" end="00:03:05.034" | 001 | 003 | 002 |
| (Scene 2) | begin="00:03:05.034" end="00:08:15.221" | 003 | 001 | 003 |
| .. | .. | .. | .. | .. |
| (Scene n) | begin="00:45:12.022" end="00:52:15.231" | 001 | 002 | 004 |

FIG.8

Image control application configuration example (3)

| Scene identifier | Reproduction time | ID of signal conversion algorithm to be applied = white balance (WB) adjustment processing algorithm designation information |
|---|---|---|
| (Scene 1) | begin="00:00:00.000" end="00:03:05.034" | WB adjustment processing algorithm A |
| (Scene 2) | begin="00:03:05.034" end="00:08:15.221" | WB adjustment processing algorithm B |
| .. | .. | .. |
| (Scene n) | begin="00:45:12.022" end="00:52:15.231" | WB adjustment processing algorithm F |

FIG.15

Image control application configuration example (4)

| Scene identifier | Reproduction time | ID of signal conversion algorithm to be applied = gamma correction processing algorithm designation information |
|---|---|---|
| (Scene 1) | begin="00:00:00.000" end="00:03:05.034" | Gamma correction processing algorithm A |
| (Scene 2) | begin="00:03:05.034" end="00:08:15.221" | Gamma correction processing algorithm B |
| .. | .. | .. |
| (Scene n) | begin="00:45:12.022" end="00:52:15.231" | Gamma correction processing algorithm F |

FIG.16

Image control application configuration example (5)

| Scene identifier | Reproduction time | ID of signal conversion algorithm to be applied = color temperature adjustment processing algorithm designation information |
|---|---|---|
| (Scene 1) | begin="00:00:00.000" end="00:03:05.034" | Color temperature adjustment algorithm A (target color temperature = 8000K~7500K) |
| (Scene 2) | begin="00:03:05.034" end="00:08:15.221" | Color temperature adjustment algorithm B (target color temperature = 5700K~5200K) |
| ·· | ·· | ·· |
| (Scene n) | begin="00:45:12.022" end="00:52:15.231" | Color temperature adjustment algorithm C (target color temperature = 5200K~4800K) |

FIG.17

IMAGE DISPLAY CONTROL APPARATUS, TRANSMISSION APPARATUS, IMAGE DISPLAY CONTROL METHOD, AND PROGRAM

CROSS-REFERENCE PARAGRAPH

The present application is a continuation application of U.S. patent application Ser. No. 15/510,727, filed Mar. 13, 2017, which is a national stage entry of PCT/JP2015/072350, filed Aug. 6, 2015, and claims the benefit of priority from prior Japanese Patent Application JP 2014-192181, filed Sep. 22, 2014, the entire content of which is hereby incorporated by reference. Each of the above-referenced applications is hereby incorporated herein by reference in its entirety.

TECHNICAL FIELD

The present disclosure relates to an image display control apparatus, a transmission apparatus, an image display control method, and a program, more specifically, to an image display control apparatus, a transmission apparatus, an image display control method, and a program with which brightness and colors of an output image are controlled in a program unit or a scene unit, according to brightness in a viewing environment of a television and the like and a color of environmental light, for example.

BACKGROUND ART

From the past, there is known a configuration of detecting brightness of a television viewing environment using an optical sensor or an illuminance sensor equipped in a television and changing luminance of output images of the television on the basis of detection values. For example, Patent Literature 1 (Japanese Patent Application Laid-open No. 2005-236520) discloses a configuration in which luminance of an output image is controlled according to sensor detection values.

With the configurations of the past that are disclosed in the technologies of the related art, however, luminance control has been performed uniformly on all contents (programs) displayed on the television.

Specifically, the uniform control involves setting luminance of an output image of a television to be high when the viewing environment is bright and setting the luminance of an output image to be low when the viewing environment is dark.

CITATION LIST

Patent Literature

Patent Literature 1: Japanese Patent Application Laid-open No. 2005-236520

DISCLOSURE OF INVENTION

Technical Problem

As described above, the image output control of the past with respect to a display apparatus such as a television involves uniformly controlling output images of the display apparatus according to the viewing environment.

For example, such a configuration does not perform output control in program units or scene units.

Television programs and scenes configuring a program include various images. Even when watching a television under a light source with the same brightness and color, by differentiating display control according to programs and scenes, optimal image outputs become possible.

For example, for outputting an image in which dark deep-sea blue is emphasized, it is effective to adjust output signals using a blue-color emphasis control algorithm for outputting an image in which blue is emphasized.

On the other hand, for emphasizing red when displaying an image including a sunset, it is necessary to control output colors according to a red-color emphasis control algorithm determined on the basis of the viewing environment.

By differentiating algorithms according to not only the brightness and color of environmental light in a viewing environment but also display scenes as the image control algorithm, it becomes possible to generate adjustment images optimal for the display scenes.

In other words, by varying a control form according to display images, optimal control corresponding to output image scenes becomes possible.

The present disclosure aims at providing an image display control apparatus, a transmission apparatus, an image display control method, and a program with which a control form of output signals corresponding to a viewing environment of a display apparatus can be changed in program units or scene units.

Solution to Problem

According to a first aspect of the present disclosure, there is provided an image display control apparatus including
a data processing unit that controls image signals to be output to a display unit,
the data processing unit
being configured to execute a display control application supporting a content to be displayed on the display unit to generate output image signals,
inputting sensor detection signals from a sensor that acquires environmental light information in a periphery of the display unit, and
applying the sensor detection signals and generating output image signals by carrying out signal conversion processing in which different signal conversion algorithms are applied to original input image signals of the content in a content unit, a unit of scenes configuring a content, or a frame unit.

Further, according to a second aspect of the present disclosure, there is provided a transmission apparatus including
a data processing unit that transmits a content to be displayed on a display unit and a display control application supporting the content via a communication unit,
the display control application being an application that records a program which applies sensor detection signals for acquiring environmental light information in a periphery of the display unit and generates output image signals by carrying out signal conversion processing in which different signal conversion algorithms are applied to original input image signals of the content in a content unit, a unit of scenes configuring a content, or a frame unit.

Further, according to a third aspect of the present disclosure, there is provided an image display control method executed in an image display control apparatus including a data processing unit that controls image signals to be output to a display unit, the image display control method including:

by the data processing unit, executing a display control application supporting a content to be displayed on the display unit to generate output image signals;

in the output image signal generation processing, inputting sensor detection signals from a sensor that acquires environmental light information in a periphery of the display unit; and applying the sensor detection signals and generating output image signals by carrying out signal conversion processing in which different signal conversion algorithms are applied to original input image signals of the content in a content unit, a unit of scenes configuring a content, or a frame unit.

Further, according to a fourth aspect of the present disclosure, there is provided a program that causes an image display control apparatus to execute output image signal generation processing, the program being a display control application supporting a content to be displayed on a display unit, the program causing the image display control apparatus to execute the step of applying sensor detection signals as environmental light information in a periphery of the display unit and generating output image signals by carrying out signal conversion processing in which different signal conversion algorithms are applied to original input image signals of the content in a content unit, a unit of scenes configuring a content, or a frame unit.

It should be noted that the program of the present disclosure is a program that can be provided to an information processing apparatus and a computer system capable of executing various program codes, for example, via a computer-readable recording medium and a communication medium. By providing such a program in a computer-readable form, processing corresponding to the program is realized on the information processing apparatus or computer system.

These and other objects, features, and advantages of the present disclosure will become more apparent in light of the following detailed description of best mode embodiments thereof, as illustrated in the accompanying drawings. It should be noted that the system used in the specification is a logical group of a plurality of apparatuses, and apparatuses having the respective configurations are not necessarily provided in the same casing.

Advantageous Effects of Invention

With the configuration according to the embodiment of the present disclosure, an apparatus and method for executing signal conversion processing according to environmental light in a content unit, a scene unit, or a frame unit to generate an output image are realized.

Specifically, the image display control apparatus includes the data processing unit that controls image signals to be output to the display unit, and the data processing unit executes the display control application supporting a content to be displayed on the display unit to generate output image signals. The data processing unit inputs sensor detection signals from a sensor that acquires environmental light information in a periphery of the display unit, and applies the sensor detection signals and generates output image signals by carrying out signal conversion processing in which different signal conversion algorithms are applied to original input image signals of the content in a content unit, a unit of scenes configuring a content, or a frame unit.

With this configuration, an apparatus and method for executing the signal conversion processing in a content unit, a scene unit, or a frame unit according to environmental light to generate an output image are realized.

It should be noted that the effects described in the specification are mere examples and should not be limited thereto. Moreover, additional effects may also be obtained.

BRIEF DESCRIPTION OF DRAWINGS

FIG. 5 A diagram for explaining a configuration example of the image control application.

FIG. 7 A diagram for explaining examples of signal conversion algorithms corresponding to scenes, that are specified by the image control application, and parameters to be applied to the algorithms.

FIG. 8 A diagram for explaining a configuration example of the image control application.

FIG. 15 A diagram for explaining a configuration example of the image control application.

FIG. 16 A diagram for explaining a configuration example of the image control application.

FIG. 17 A diagram for explaining a configuration example of the image control application.

MODES FOR CARRYING OUT THE INVENTION

Figure 1:
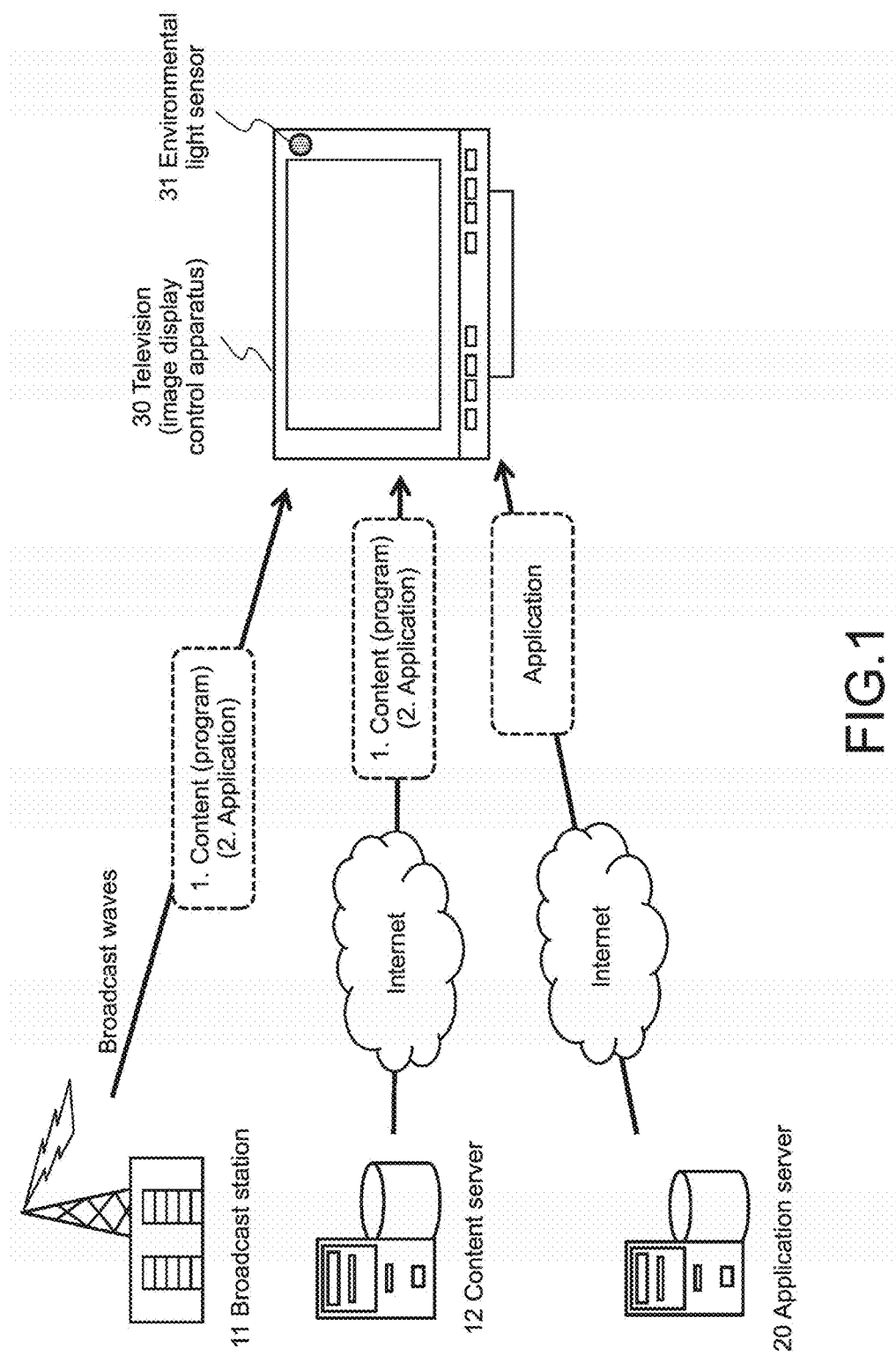
FIG. 1 A diagram for explaining a configuration example of a communication system that executes processing of the present disclosure.

Hereinafter, an image display control apparatus, a transmission apparatus, an image display control method, and a program according to the present disclosure will be described in detail with reference to the drawings. It should be noted that descriptions will be made in the following order.

1. General outline of processing executed by image display control apparatus of present disclosure 2. Sequence of processing executed by image display control apparatus of present disclosure 3. Example of image control application applied by image display control apparatus of present disclosure 4. Other examples of image control application 5. Configuration example of apparatus 6. Conclusion of configuration of present disclosure

[1. General Outline of Processing Executed by Image Display Control Apparatus of Present Disclosure]

First, a general outline of processing executed by an image display control apparatus of the present disclosure will be described with reference to FIG. 1 and subsequent figures.

FIG. 1 shows a television 30 as an example of the image display control apparatus, a broadcast station 11 as a transmission apparatus that transmits contents (programs) to the television 30, a content server 12, and an application server 20 as a transmission apparatus that provides an application program executable in the television 30 (hereinafter, referred to as application).

The broadcast station 11 and the content server 12 provide contents such as a broadcast program to be output to the television 30.

The broadcast station 11 transmits contents by broadcast via broadcast waves. The content server 12 performs unicast delivery or multicast delivery of contents, and the like via a network such as the Internet.

It should be noted that FLUTE (File Delivery over Uni-directional Transport), for example, is applicable as a communication protocol applied to these content deliveries.

FLUTE has been developed for use mainly in asynchronous file transfer, but since an extension is made to also be applied to broadcast streaming, FLUTE is a protocol having a configuration also applicable to a broadcast-type data delivery that uses broadcast waves.

By the data delivery that uses the FLUTE protocol, the broadcast station 11 and the content server 12 are capable of transmitting not only contents such as a broadcast program but also various types of metadata and application files to the television 30.

It should be noted that the application server 20 also provides applications to be executed in the television 30 via the Internet.

As shown in FIG. 1, the television 30 is capable of acquiring applications to be executed in the television 30 from any of the broadcast station 11, the content server 12, and the application server 20.

It should be noted that one of the applications to be executed in the television 30, which the television 30 has acquired from the broadcast station 11, the content server 12, or the application server 20, is an image control application (program) for carrying out content (program)-supporting image control processing.

The television 30 includes Android (registered trademark) as an OS (Operating System), for example, and is capable of executing various applications operated on the Android (registered trademark) OS.

The image control application received from the broadcast station 11, the content server 12, or the application server 20 is an application operated on the Android (registered trademark) OS.

The television 30 includes an environmental light sensor 31. The environmental light sensor 31 is an optical sensor that acquires brightness of a viewing environment of the television 30 and color information (color phase) of environmental light.

In the embodiment below, detection values acquired by the environmental light sensor 31 include the following respective values.

Luminance information (Y)

Color difference information (U, V)

These values are acquired by the environmental light sensor 31.

The luminance (Y) is so-called brightness and is a value indicating brightness of the viewing environment of the television 30. As the luminance (Y) value detected by the environmental light sensor 31 becomes larger, the viewing environment becomes brighter. As the detected luminance (Y) value becomes smaller, the viewing environment becomes darker.

The color difference (U) is one of index values indicating a blue (Blue)-based color intensity. As a color difference (U) value detected by the environmental light sensor 31 becomes larger, a blue-color emphasis of environmental light color in the viewing environment becomes stronger. As the detected color difference (U) value becomes smaller, the blue-color emphasis of the environmental light color becomes weaker.

The color difference (V) is one of index values indicating a red (Red)-based color intensity. As a color difference (V) value detected by the environmental light sensor 31 becomes larger, a red-color emphasis of the environmental light color in the viewing environment becomes stronger. As the detected color difference (V) value becomes smaller, the red-color emphasis of the environmental light color becomes weaker.

It should be noted that in the embodiment below, a processing example that uses YUV signals, that is, an embodiment in which the environmental light sensor 31 acquires YUV values as detection values and YUV values of output signals with respect to the television 30 are controlled using the image control application executed in the television 30, will be described.

It should be noted that this embodiment is a mere example, and the processing of the present disclosure is not limited to the YUV signals. For example, the processing can also be carried out using various signal systems such as YCbCr signals and RGB signals.

Specifically, a configuration in which the environmental light sensor 31 acquires, as the detection values, YCbCr values or RGB values corresponding to environmental light, and the YCbCr values or RGB values of output signals with respect to the television 30 are controlled using the image control application executed in the television 30 is also possible.

Further, when the signal system of detection values of the environmental light sensor 31 differs from that of output signals, that is, when the signal systems to be processed differ such as in a case where the detection values of the environmental light sensor 31 are YUV and the output signals with respect to the television 30 are RBG, for example, it is possible to execute signal conversion processing by applying a well-known signal conversion expression and perform control.

Next, the image display control apparatus of the present disclosure will be described with reference to FIG. 2 using a specific example of image display control that is executed by the television 30 shown in FIG. 1, for example.

Figure 2:
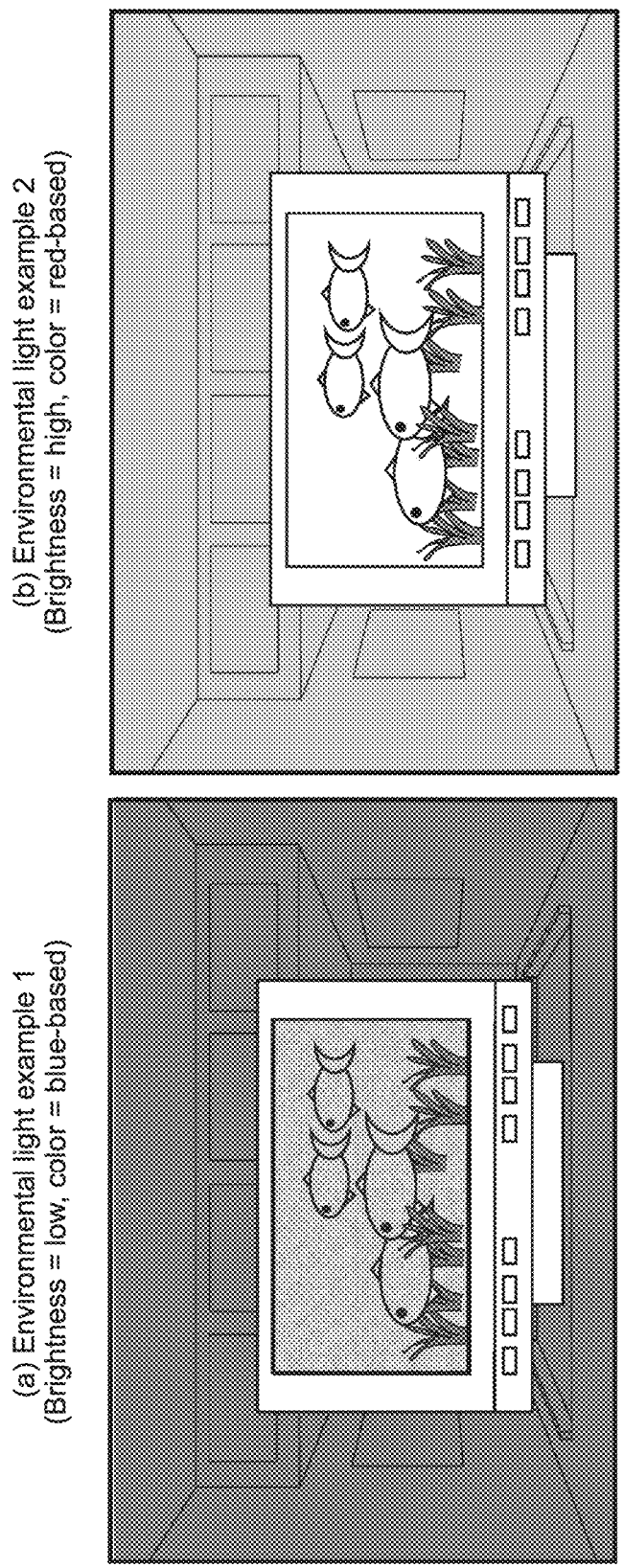
FIG. 2 Diagrams for explaining an example of processing executed by an image display control apparatus.

FIG. 2 are diagrams each showing an image display example in which the television 30 that has acquired detection values from the environmental light sensor 31 displays, on a display unit thereof, output image signals generated by executing the image control application.

FIG. 2 show image display examples under two different types of environmental light.

(a) is an output image example in a case where the environmental light is dark and the color of environmental light is blue-based. Explaining it using the YUV values described above, shown is the image display example in a case where the environmental light has the following YUV settings.

Luminance (Y)=low
Color difference (U)=high
Color difference (V)=low

On the other hand, (b) is an output image example in a case where the environmental light is bright and the color of environmental light is red-based. Explaining it using the YUV values described above, shown is the image display example in a case where the environmental light has the following YUV settings.

Luminance (Y)=high
Color difference (U)=low
Color difference (V)=high

FIGS. 2(a) and (b) are the image display examples in the case where different sensor detection values are acquired from the environmental light sensor 31.

Images displayed on the television 30 are each a scene showing an underwater image, and output signals with respect to the television 30 are adjusted according to the environmental light and scenes.

In the two different environments shown in FIGS. 2(a) and (b), the images displayed on the television are adjusted to have different brightness and color phase settings.

This output signal adjustment processing is carried out according to the image control application executed in the television 30.

The image control application is set in accordance with a content (program), for example. In other words, output control according to the image control application unique to each content (program) is executed.

By applying the image control application unique to a content (program), output signal control onto which an intention of a producer (owner) of a content (program) is reflected becomes possible.

The image control application unique to a content (program) includes a program for executing luminance or color phase control according to environmental light in a unit of scenes included in a content or a frame unit.

For example, as shown in FIG. 2, with respect to an underwater image, an output signal adjustment that emphasizes blue in water, for example, is executed according to environmental light.

Specifically, original image signals are converted to generate output signals according to environmental light detection values (YUV) detected by the environmental light sensor 31 so that blue of the output image signals is emphasized.

It should be noted that in descriptions below, the original image signals preset for the contents (programs) transmitted from the broadcast station 11 and the content server 12 are described as input image signals=(YUV)in.

Further, the environmental light detection values detected by the environmental light sensor 31 are described as sensor detection signals=(YUV)sns.

Furthermore, adjusted image signals generated by applying a content-supporting image control application, that is, image signals of an image to be output to the television 30, are described as output image signals=(YUV)out.

It should be noted that individual YUV signals input image signals=Yin, Uin, Vin
sensor detection signals=Ysns, Usns, Vsns
output image signals=Yout, Uout, Vout are described as in the above.

[2. Sequence of Processing Executed by Image Display Control Apparatus of Present Disclosure]

Next, a sequence of processing executed by the image display control apparatus of the present disclosure will be described.

The image display control apparatus of the present disclosure, for example, the television 30 shown in FIG. 1, receives contents such as a broadcast program from the broadcast station 11 or the content server 12 shown in FIG. 1.

Further, a content-supporting image control application is received from any of the broadcast station 11, the content server 12, and the application server 20 shown in FIG. 1, and content display control, specifically, luminance control and color phase control, are executed by applying the received image control application.

By executing the content-supporting image control application, output signal control corresponding to the environmental light, scenes in a content, and the like is executed as described with reference to FIG. 2.

Figure 3:
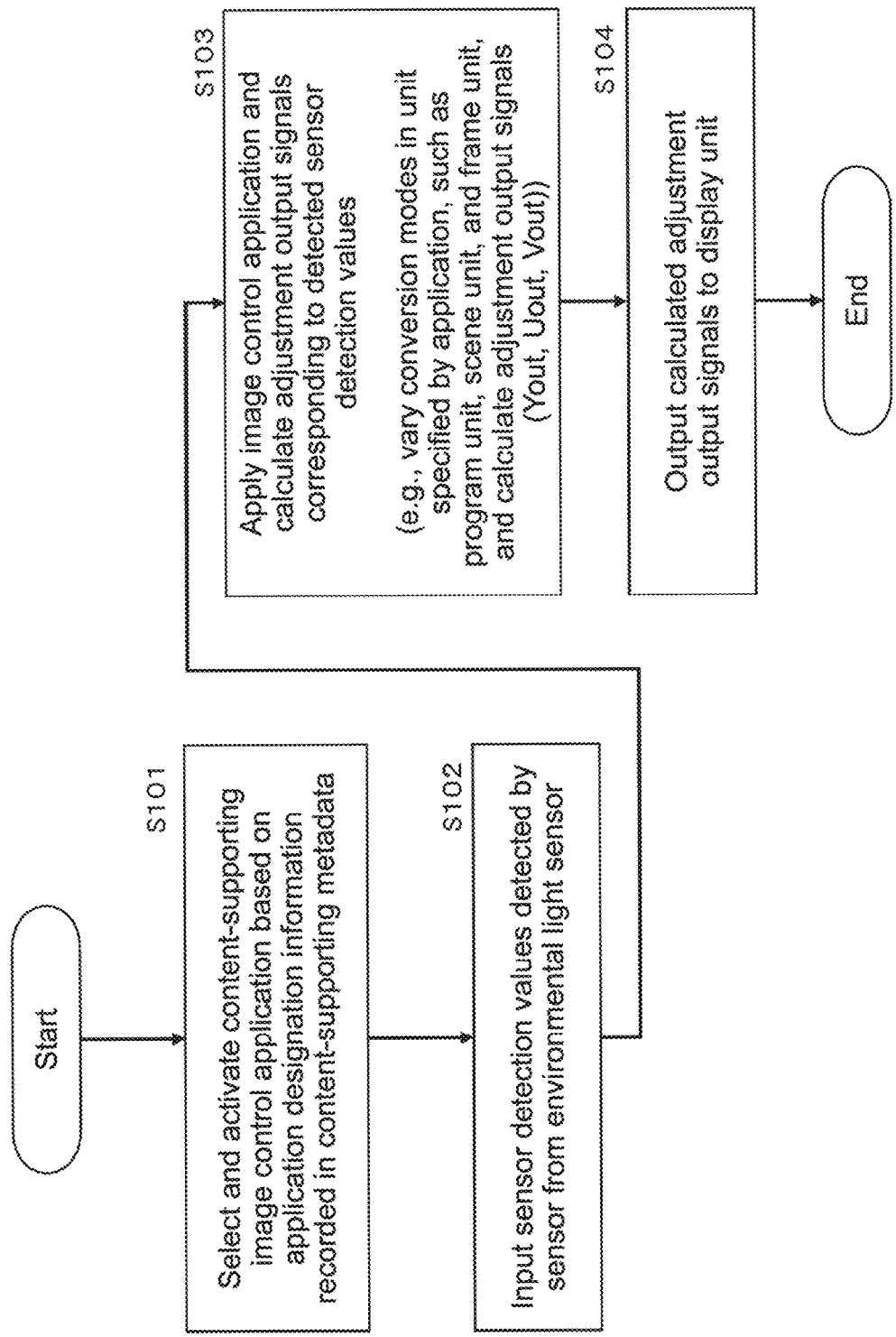
FIG. 3 A diagram showing a flowchart for explaining a sequence of the processing executed by the image display control apparatus.

The flowchart shown in FIG. 3 is a flowchart for explaining a processing sequence executed by the image display control apparatus of the present disclosure, for example, the television 30 shown in FIG. 1.

The image display control apparatus executes, by a data processing unit including a processor (CPU etc.) that includes a program execution function, processing of the flow shown in FIG. 3 according to the image control applications or other programs stored in a storage unit.

Hereinafter, the processing of the steps in the flow shown in FIG. 3 will sequentially be described.

It should be noted that it is assumed that the image display control apparatus (e.g., television 30) receives content (program)-supporting image control applications in advance before starting the flow shown in FIG. 3 and stores them in the storage unit.

(Step S101)

In Step S101, the data processing unit of the image display control apparatus first acquires content-supporting metadata as adjunct data of a content such as a broadcast program that is received from the broadcast station 11 or the content server 12 shown in FIG. 1.

Then, based on application designation information recorded in the acquired metadata, a content-supporting image control application is selected and activated.

As described above, the image control application is set for each program and the like in a content unit.

The image display control apparatus (e.g., television 30) acquires the image control applications corresponding to respective contents in advance from the broadcast station 11, the content server 12, or the application server 20 and stores them in the storage unit.

In other words, the storage unit of the image display control apparatus (e.g., television 30) stores a plurality of image control applications respectively corresponding to a plurality of contents.

Therefore, processing of selecting an image control application corresponding to a content to be received from the broadcast station 11 or the content server 12 becomes necessary.

In this selection processing, recording information of metadata transmitted together with or prior to the content to be received from the broadcast station 11 or the content server 12 is used.

Figure 4:
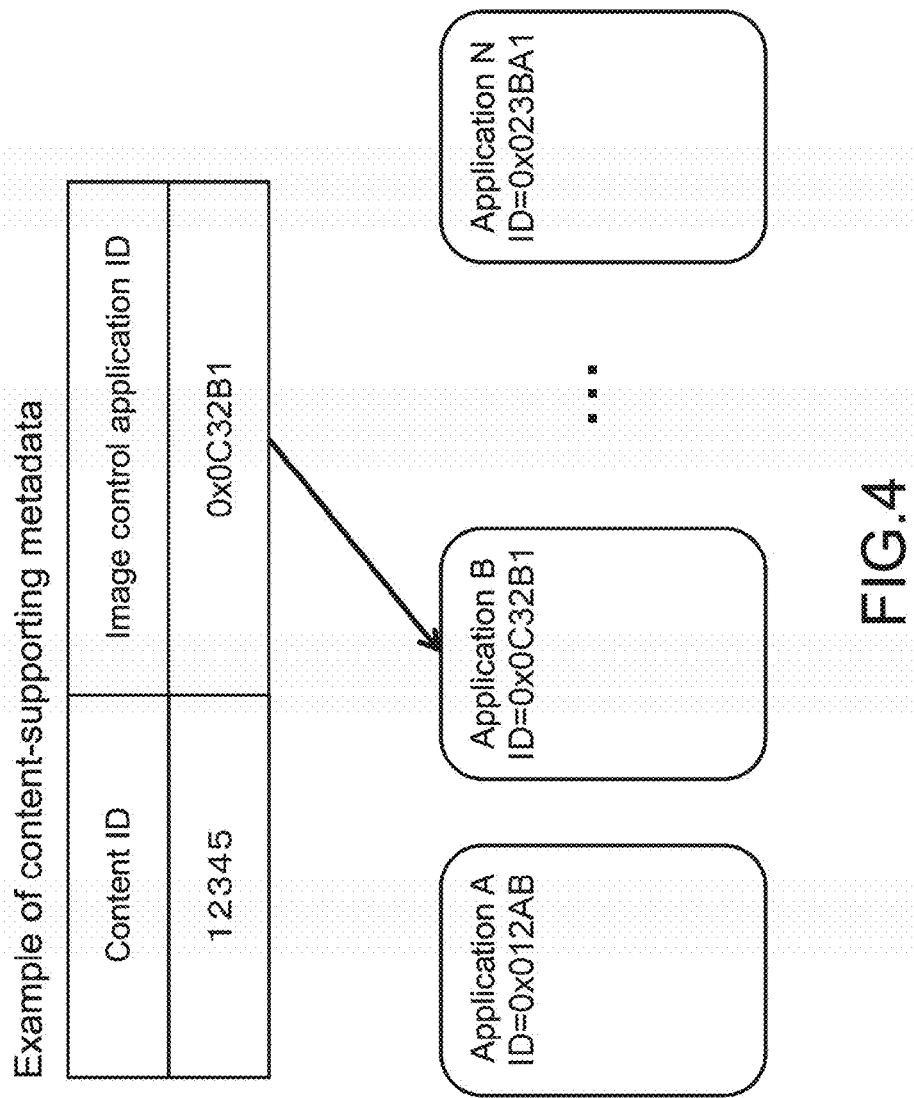
FIG. 4 A diagram for explaining an example of selection processing of an image control application that is based on content-supporting metadata.

An example of the content-supporting metadata is shown in FIG. 4.

As shown in FIG. 4, in the content-supporting metadata, an identifier (ID) of the image control application corresponding to that content is recorded.

The data processing unit of the image display control apparatus (e.g., television 30) selects, based on the identifier (ID) of the image control application recorded in the metadata, an image control application corresponding to the content to be displayed out of the plurality of image control applications stored in the storage unit.

An ID is set for each of the image control applications stored in the storage unit, and an application having the same identifier (ID) as that of the image control application set in the content-supporting metadata is selected and activated.

(Step S102)

Next, in Step S102, the data processing unit of the image display control apparatus inputs sensor detection signals (environmental light information) acquired by the environmental light sensor 31.

As described above, the detection signals (environmental light information) acquired by the environmental light sensor 31 are constituted of the following values, for example.

Luminance information (Y)

Color difference information (U, V)

These values are acquired by the environmental light sensor 31 and input to the data processing unit.

(Step S103)

Next, in Step S103, the data processing unit of the image display control apparatus applies the content-supporting image control application selected in Step S101 and calculates output image signals according to the sensor detection signals (environmental light information).

For example, output signals (Yout, Uout, Vout) adjusted in accordance with an adjustment processing form (signal conversion algorithm) set in a unit specified by the image control application, such as a content (program) unit, a scene unit, and a frame unit are calculated.

In the content received from the broadcast station 11 or the content server 12, original image signals, that is, input image signals=(YUV)in are recorded.

The data processing unit of the image display control apparatus converts the input image signals=(YUV)in according to the signal conversion algorithm specified in the image control application to generate output image signals=(YUV)out.

In this conversion processing, the detection values detected by the environmental light sensor 31, that is, sensor detection signals=(YUV)sns are taken into consideration to execute the processing that uses the sensor detection values.

It should be noted that a specific example and specific processing example of the image control application will be described later.

(Step S104)

Next, in Step S104, the data processing unit of the image display control apparatus outputs the output image signals generated in Step S103 to the display unit.

By the processing as described above, output signal adjustment processing corresponding to the environmental light is carried out in a content unit, a scene unit, or a frame unit to display adjusted image signals as described above with reference to FIG. 2, for example.

[3. Example of Image Control Application Applied by Image Display Control Apparatus of Present Disclosure]

Next, a specific example of the image control application executed by the image display control apparatus will be described.

As described above, the image control application is an application program that is set in a unit of each content such as an individual program.

The image display control apparatus (e.g., television 30) acquires the image control applications corresponding to the respective contents in advance from the broadcast station 11, the content server 12, or the application server 20 and stores them in the storage unit.

Referring to FIG. 5, one configuration example of the image control application executed by the image display control apparatus will be described.

FIG. 5 shows a correspondence relationship among three pieces of data including scene identifier, reproduction time, and ID (identifier) of signal conversion algorithm to be applied.

The content-supporting image control application records, for each scene included in the content as shown in FIG. 5, for example, reproduction time information of the relevant scene and signal conversion algorithm to be applied to that scene. It should be noted that in the figure, an algorithm ID is indicated as the algorithm.

According to scene sections such as (Scene 1)=scene showing underwater (Scene 2)=scene showing sunset the content-supporting image control application records the reproduction times and the signal conversion algorithms to be applied to those scenes, for example.

The reproduction time is specified information including scene start time information (begin) and scene end time information (end).

It should be noted that an image frame identifier may be recorded in place of the reproduction time.

The signal conversion algorithms to be applied to the respective scenes are signal conversion algorithms to be applied for calculating output image signals (YUV)out from input image signals (YUV)in.

It should be noted that the signal conversion algorithms are algorithms for calculating the output image signals (YUV)out while taking into consideration the sensor detection signals (YUV)sns.

Specific examples of the signal conversion algorithm will be described later.

Figure 6:
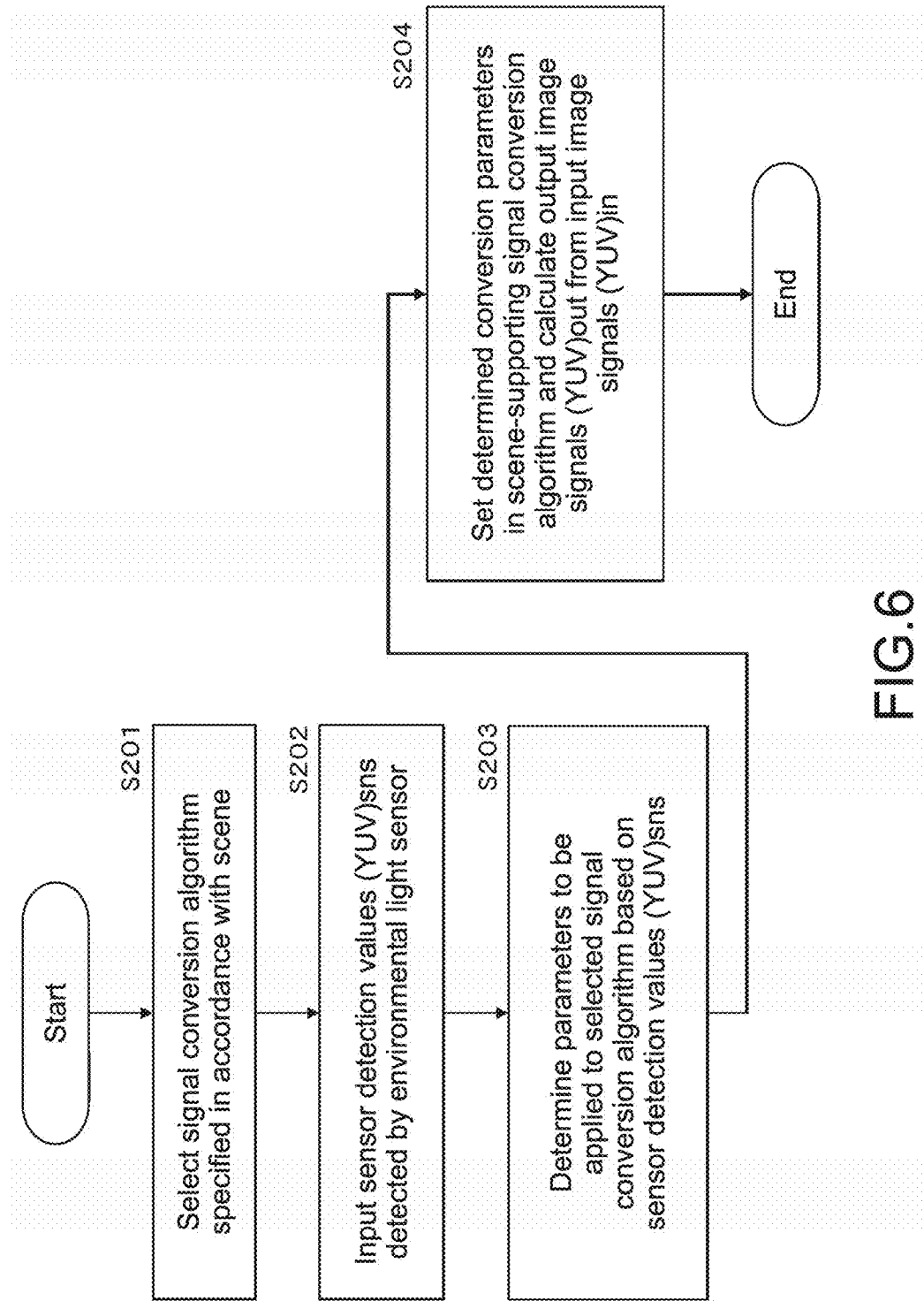
FIG. 6 A diagram showing a flowchart for explaining a sequence of image control processing that uses the image control application.

The flowchart shown in FIG. 6 is a flowchart for explaining one sequence example of the processing of calculating output image signals (YUV)out by applying the image control application in the image display control apparatus (television 30).

The flowchart corresponds to a specific sequence of the processing executed in Steps S102 and S103 in the flow shown in FIG. 3 described above.

The processing of the steps in the flow shown in FIG. 6 will be described in detail.

It should be noted that at a time point the flow shown in FIG. 6 is started, the processing of Step S101 in the flow shown in FIG. 3, that is, the selection and activation of a content-supporting image control application, is assumed to have been executed.

(Step S201)

First, in Step S201, the data processing unit of the image display control apparatus (television 30) selects a signal conversion algorithm specified in correspondence with a scene to be displayed from the activated content-supporting image control application.

A case of applying the image control application having the setting shown in FIG. 5 will be described.

When displaying (Scene 1), a (Scene 1)-supporting signal conversion algorithm having an ID=001 is selected.

(Step S202)

In Step S202, the data processing unit of the image display control apparatus (television 30) inputs sensor detection values (YUV)sns detected by the sensor, from the environmental light sensor 31.

(Step S203)

Next, in Step S203, the data processing unit of the image display control apparatus (television 30) determines parameters to be applied to the signal conversion algorithm corresponding to the selected scene based on the sensor detection signals (YUV)sns acquired in Step S202.

It should be noted that the algorithm used in the parameter determination processing (e.g., function F) is recorded in the image control application together with the signal conversion algorithm.

A specific example will be described later.

(Step S204)

Next, in Step S204, the data processing unit of the image display control apparatus (television 30) sets the conversion parameters determined in Step S203 in the scene-supporting signal conversion algorithm selected in Step S201 and calculates output image signals (YUV)out from the input image signals (YUV)in.

The specific example of the scene-supporting signal conversion algorithm and the example of the parameters to be applied to the signal conversion algorithm will be described with reference to FIG. 7.

FIG. 7 shows a correspondence example of three pieces of data including a scene identifier, a signal conversion algorithm corresponding to that scene, and parameters determined based on sensor detection signals (YUV)sns.

The signal conversion algorithm to be applied to (Scene 1), that is, the signal conversion algorithm for converting original input image signals (YUV)in of image data of a reception content to calculate output image signals (YUV)out to be output to the display unit of the television 30, is the following algorithm.

$Y\text{out}=a*(Y\text{in})+b$ $U\text{out}=c*(U\text{in})+d$ $V\text{out}=e*(V\text{in})+f$ a to f in the algorithm above are parameters that are determined based on the sensor detection signals (YUV)sns.

In the entry at the right end portion of the table shown in FIG. 7, "parameters determined based on sensor detection signals (YUV)sns" are indicated.

These parameters are calculated by applying a predetermined algorithm, for example, a function, to the sensor detection signals (YUV)sns.

Specifically, the parameters a to f are calculated by the following function application processing, for example.

$a=F_{11}(Y\text{sns})$ $b=F_{12}(Y\text{sns})$ $c=F_{13}(U\text{sns})$ $d=F_{14}(U\text{sns})$ $e=F_{15}(V\text{sns})$ $f=F_{16}(V\text{sns})$ It should be noted that the functions $F_{11}$ to $F_{16}$ are recorded in the image control application together with the signal conversion algorithm.

The data processing unit of the image display control apparatus (television 30) applies the functions $F_{11}$ to $F_{16}$ above to calculate the parameters a to f in Step S203 described above in the flow shown in FIG. 7.

Further, in Step S204, the calculated parameters a to f are set in the signal conversion algorithm to calculate the output image signals (YUV)out.

Specifically, the parameters a to f and the input image signals (YUV)in are set in $Y\text{out}=a*(Y\text{in})+b$ $U\text{out}=c*(U\text{in})+d$ $V\text{out}=e*(V\text{in})+f$ the signal conversion algorithm above to calculate the output image signals (YUV)out.

It should be noted that the signal conversion algorithm is changed in a scene unit, a frame unit, or a content unit, for example.

FIG. 7 also shows an entry including a signal conversion algorithm corresponding to (Scene 2) and parameters thereof.

The signal conversion algorithm to be applied to (Scene 2), that is, the signal conversion algorithm for converting original input image signals (YUV)in of image data of a reception content to calculate output image signals (YUV)out to be output to the display unit of the television 30, is the following algorithm.

$Y\text{out}=a*(Y\text{in})+b$ $U\text{out}=c*(U\text{in})+d(V\text{in})$ $V\text{out}=e*(V\text{in})+f(U\text{in})$ a to f in the algorithm above are parameters that are determined based on the sensor detection signals (YUV)sns.

As shown in the entry at the right end portion of the table shown in FIG. 7, these parameters are calculated by the following function application processing.

$a=F_{21}(Y\text{sns})$ $b=F_{22}(Y\text{sns})$ $c=F_{23}(U\text{sns})$ $d=F_{24}(V\text{sns})$ $e=F_{25}(V\text{sns})$ $f=F_{26}(U\text{sns})$ It should be noted that the functions $F_{21}$ to $F_{26}$ are recorded in the image control application together with the signal conversion algorithm.

When displaying an image of (Scene 2), the data processing unit of the image display control apparatus (television 30) applies the functions $F_{21}$ to $F_{26}$ above to calculate the parameters a to f in Step S203 described above in the flow shown in FIG. 7.

Further, in Step S204, the calculated parameters a to f are set in the signal conversion algorithm to calculate the output image signals (YUV)out.

Specifically, the parameters a to f and the input image signals (YUV)in are set in $$Y\text{out}=a*(Y\text{in})+b$$

$$U\text{out}=c*(U\text{in})+d(V\text{in})$$

$$V\text{out}=e*(V\text{in})+f(U\text{in})$$

the signal conversion algorithm above to calculate the output image signals (YUV)out.

As described above, the content-supporting image control application records signal conversion algorithms to be applied for respective scenes included in a content and parameters that are determined based on the sensor detection values.

The image display control apparatus successively changes the signal conversion algorithm to be applied to each scene and the parameters and calculates output image signals (YUV)out.

By the processing as described above, image signals adjusted in accordance with the scenes and environmental light are output.

It should be noted that although the unit of changing the signal conversion algorithm and parameters is set as a scene unit in the example described with reference to the figure, the conversion unit may be various units such as a frame unit and a content (program) unit.

[4. Other Examples of Image Control Application]

The configuration and application examples of one image control application have been described with reference to FIGS. 5 to 7.

However, the image control application is not limited to the configurations described with reference to FIGS. 5 to 7 and may take various configurations.

Hereinafter, examples of a plurality of image control applications will be described.

FIG. 8 shows an image control application configuration example (2).

FIG. 8 shows a correspondence relationship among three pieces of data including a scene identifier, a reproduction time, and an ID (identifier) of a signal conversion algorithm to be applied.

The example shown in FIG. 8 is different from that shown in FIG. 5 above in that algorithms respectively corresponding to YUV signals can be set for

[ID (Identifier) of Signal Conversion Algorithm to be Applied].

The setting is made such that different signal conversion algorithms can be selectively applied to the YUV signals.

An example of the signal conversion algorithms to be respectively applied to the YUV signals will be described with reference to FIG. 9 and subsequent figures.

Figure 9:
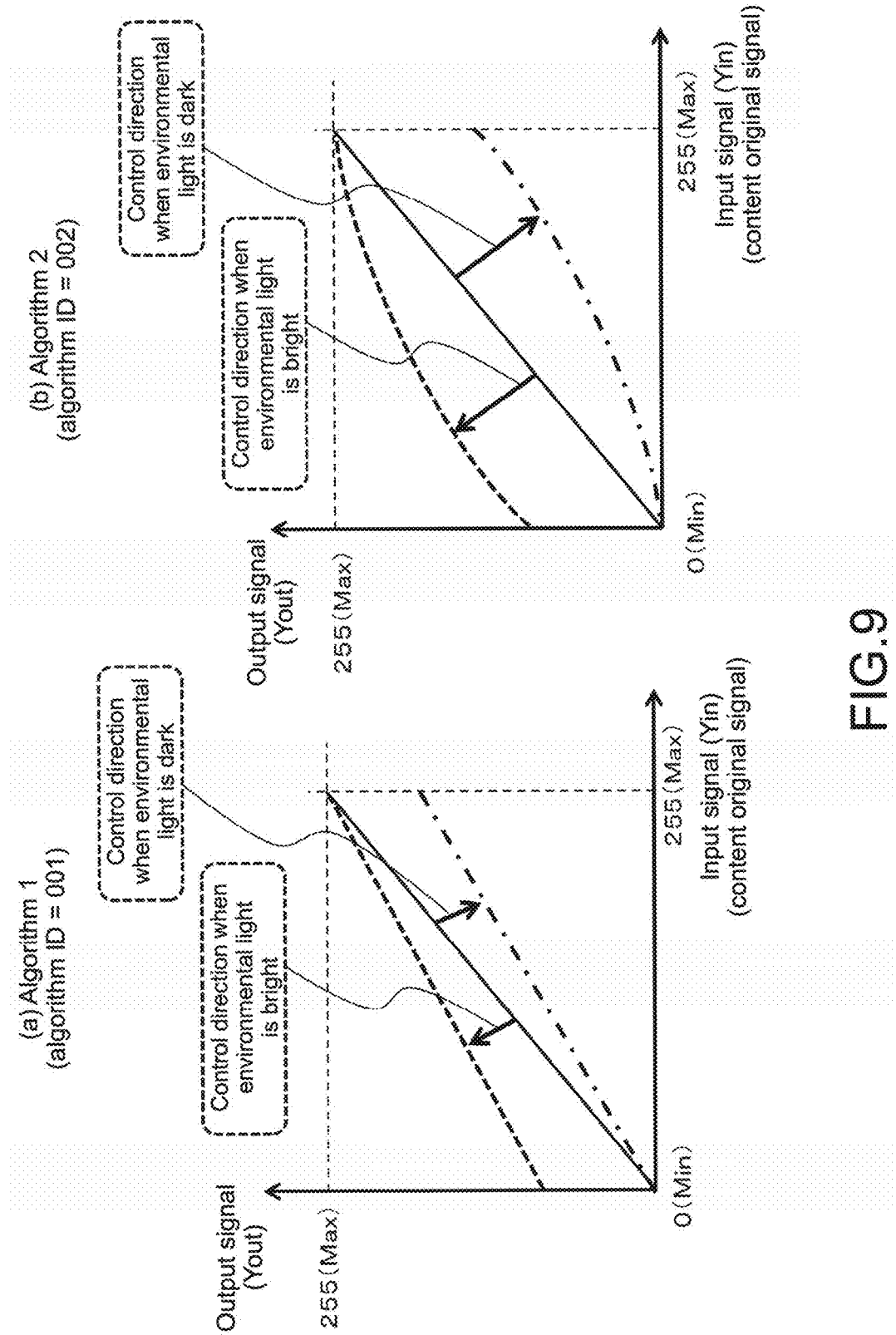
FIG. 9 Diagrams for explaining examples of the signal conversion algorithm.
Figure 10:
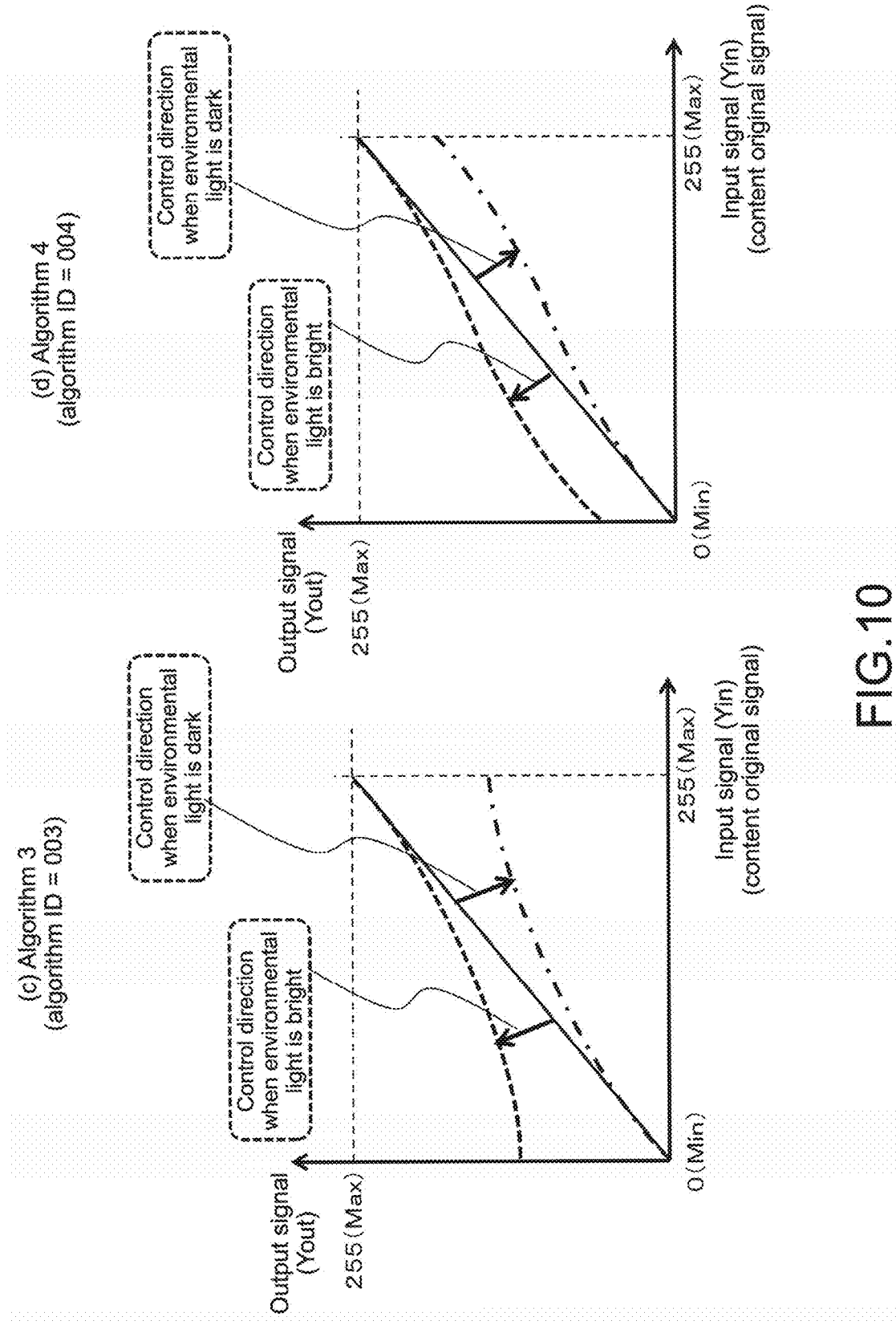
FIG. 10 Diagrams for explaining examples of the signal conversion algorithm.

FIGS. 9 and 10 show 4 examples of the signal conversion algorithm to be applied to the Y signal.

In the graph shown in Algorithm 1 (algorithm ID=001) of FIG. 9(a), the abscissa axis represents an original image signal of a content, that is, a luminance signal Yin out of the input image signals (YUV)in, and the ordinate axis represents an output image signal Yout generated by the signal conversion processing.

The solid line in the graph indicates input luminance signal Yin=output luminance signal Yout.

Specifically, an example of a case where the output luminance signal Yout generated by applying the signal conversion algorithm coincides with the input luminance signal Yin and pixel values (input values) preset in a reception content are output as they are is shown.

This corresponds to a setting in a case where the luminance Ysns detected by the environmental light sensor 31 is a standard luminance value assumed by a content producer.

When the luminance Ysns detected by the environmental light sensor 31 is higher than the standard luminance value assumed by a content producer, that is, when the environmental light is bright, the correspondence relationship between input/output values moves from the solid line shown in FIG. 9(a) to the upper dotted line side by the signal conversion processing to which the signal conversion algorithm 1 is applied.

Specifically, the luminance signal Yin of the input image signals is converted into the output luminance signal Yout having a higher luminance value than the input value.

A change amount of the luminance value is set to become larger as the input luminance value becomes smaller.

It should be noted that the dotted line in the figure is a line indicating a correspondence relationship between the input luminance value and the output luminance value in a case where a certain luminance value higher than the standard luminance value is measured as the luminance Ysns detected by the environmental light sensor 31.

When the luminance Ysns detected by the environmental light sensor 31 is additionally high, the dotted line indicating the correspondence relationship between the input luminance value and the output luminance value moves further upwardly, and moves downwardly in the case where it is lower.

On the other hand, when the luminance Ysns detected by the environmental light sensor 31 is lower than the standard luminance value assumed by a content producer, that is, when the environmental light is dark, the correspondence relationship between input/output values moves from the solid line shown in FIG. 9(a) to the lower dashed-dotted line side by the signal conversion processing to which the signal conversion algorithm 1 is applied.

Specifically, the luminance signal Yin of the input image signals is converted into the output luminance signal Yout having a lower luminance value than the input value.

The change amount of the luminance value is set to become larger as the input luminance value becomes larger.

It should be noted that the reverse-dotted line in the figure is a line indicating a correspondence relationship between the input luminance value and the output luminance value in a case where a certain luminance value lower than the standard luminance value is measured as the luminance Ysns detected by the environmental light sensor 31.

When the luminance Ysns detected by the environmental light sensor 31 is additionally low, the reverse-dotted line indicating the correspondence relationship between the input luminance value and the output luminance value moves further downwardly, and moves upwardly in the case where it is higher.

Also in the graph shown in Algorithm 2 (algorithm ID=002) of FIG. 9(b), the abscissa axis represents an original image signal of a content, that is, a luminance signal Yin out of the input image signals (YUV)in, and the ordinate axis represents an output image signal Yout generated by the signal conversion processing.

The solid line in the graph indicates
input luminance signal Yin=output luminance signal Yout.

Specifically, an example of a case where the output luminance signal Yout generated by applying the signal conversion algorithm coincides with the input luminance signal Yin and pixel values (input values) preset in a reception content are output as they are is shown.

This corresponds to a setting in a case where the luminance Ysns detected by the environmental light sensor 31 is a standard luminance value assumed by a content producer.

When the luminance Ysns detected by the environmental light sensor 31 is higher than the standard luminance value assumed by a content producer, that is, when the environmental light is bright, the correspondence relationship between input/output values moves from the solid line shown in FIG. 9(b) to the upper curved dotted line side by the signal conversion processing to which the signal conversion algorithm 2 is applied.

Specifically, the luminance signal Yin of the input image signals is converted into the output luminance signal Yout having a higher luminance value than the input value.

A change amount of the luminance value is set to become larger as the input luminance value becomes smaller.

It should be noted that the curved dotted line in the figure is a line indicating a correspondence relationship between the input luminance value and the output luminance value in a case where a certain luminance value higher than the standard luminance value is measured as the luminance Ysns detected by the environmental light sensor 31.

When the luminance Ysns detected by the environmental light sensor 31 is additionally high, the dotted line indicating the correspondence relationship between the input luminance value and the output luminance value moves further upwardly, and moves downwardly in the case where it is lower.

On the other hand, when the luminance Ysns detected by the environmental light sensor 31 is lower than the standard luminance value assumed by a content producer, that is, when the environmental light is dark, the correspondence relationship between input/output values moves from the solid line shown in FIG. 9(b) to the lower curved dashed-dotted line side by the signal conversion processing to which the signal conversion algorithm 2 is applied.

Specifically, the luminance signal Yin of the input image signals is converted into the output luminance signal Yout having a lower luminance value than the input value.

The change amount of the luminance value is set to become larger as the input luminance value becomes larger.

It should be noted that the curved reverse-dotted line in the figure is a line indicating a correspondence relationship between the input luminance value and the output luminance value in a case where a certain luminance value lower than the standard luminance value is measured as the luminance Ysns detected by the environmental light sensor 31.

When the luminance Ysns detected by the environmental light sensor 31 is additionally low, the reverse-dotted line indicating the correspondence relationship between the input luminance value and the output luminance value moves further downwardly, and moves upwardly in the case where it is higher.

FIG. 10 show luminance signal conversion examples of
(c) Algorithm 3 (algorithm ID=003) and
(d) Algorithm 4 (algorithm ID=004).

In each of the graphs, the solid line, the curved dotted line, and the curved dashed-dotted line each indicate a correspondence relationship between the input luminance value Yin and the output luminance value Yout in the following settings.

Solid line=setting in case where luminance Ysns detected by environmental light sensor 31 is standard luminance value assumed by content producer Curved dotted line=setting in case where luminance Ysns detected by environmental light sensor 31 is higher (brighter) than standard luminance value assumed by content producer Curved dashed-dotted line=setting in case where luminance Ysns detected by environmental light sensor 31 is lower (darker) than standard luminance value assumed by content producer The image display control apparatus (television 30) executes the signal conversion processing by applying any of the 4 signal conversion algorithms shown in FIGS. 9 and 10 according to a scene configuring a content, for example, and calculates a luminance value (Yout) of output image signals.

It should be noted that although the setting examples of the luminance signal conversion algorithms are shown in FIGS. 9 and 10, these are examples of a part of the signal conversion algorithms, and various other types of conversion processing are also applicable.

Although FIGS. 9 and 10 are examples of the conversion algorithms for the luminance signal (Y),
the conversion algorithms corresponding to the respective signals are specified and applied by the image control program also for the color difference signals (U, V).

Figure 11:
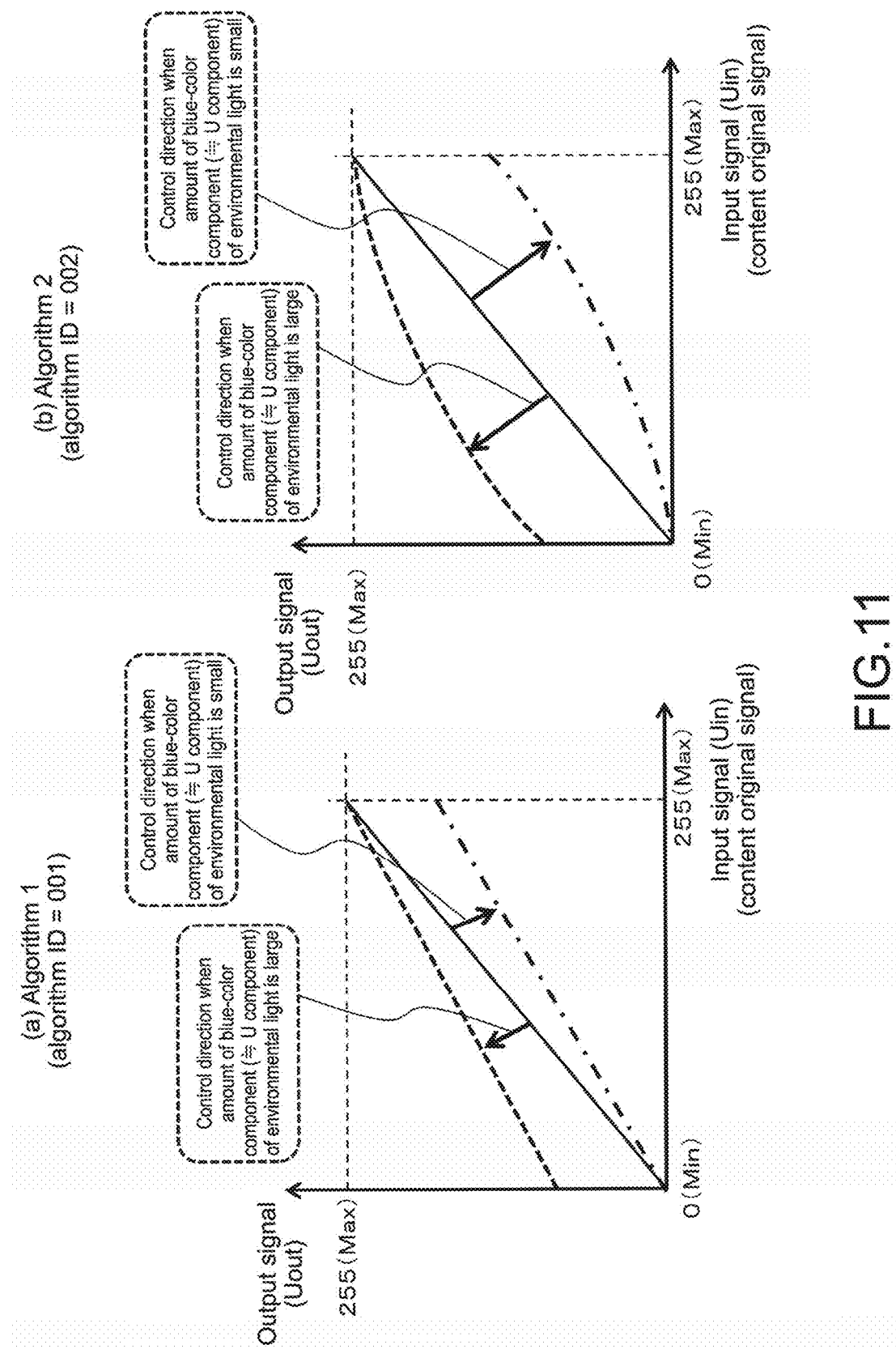
FIG. 11 Diagrams for explaining examples of the signal conversion algorithm.
Figure 12:
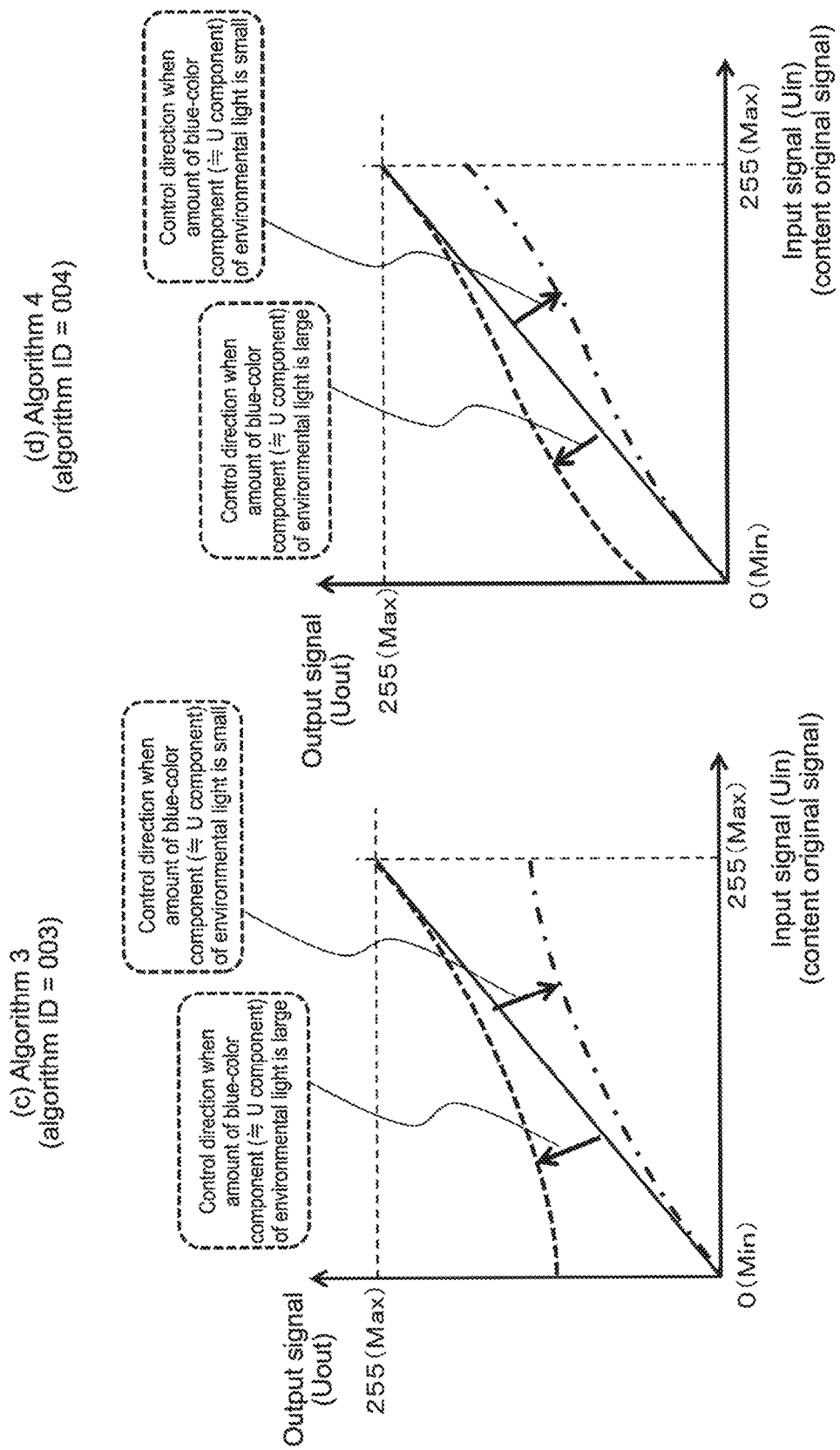
FIG. 12 Diagrams for explaining examples of the signal conversion algorithm.

FIGS. 11 and 12 show examples of the signal conversion algorithms that are applied to the color difference signal U.

FIGS. 11 and 12 show conversion examples of the color difference signal U using
(a) Algorithm 1 (algorithm ID=001),
(b) Algorithm 2 (algorithm ID=002),
(c) Algorithm 3 (algorithm ID=003), and
(d) Algorithm 4 (algorithm ID=004).

In each of the graphs, the solid line, the curved dotted line, and the curved dashed-dotted line each indicate a correspondence relationship between the input color difference signal value Uin and the output color difference signal value Uout in the following settings.

Solid line=setting in case where color difference signal value Usns detected by environmental light sensor 31 is standard color difference signal value assumed by content producer Curved dotted line=setting in case where color difference signal value Usns detected by environmental light sensor 31 is higher than standard color difference signal value assumed by content producer Curved dashed-dotted line=setting in case where color difference signal value Usns detected by environmental light sensor 31 is lower than standard color difference signal value assumed by content producer The image display control apparatus (television 30) executes the signal conversion processing by applying any of the 4 signal conversion algorithms shown in FIGS. 11 and 12 according to a scene configuring a content, for example, and calculates a color difference signal value (Uout) of output image signals.

It should be noted that although the setting examples of the luminance signal conversion algorithms are shown in FIGS. 11 and 12, these are examples of a part of the signal conversion algorithms, and various other types of conversion processing are also applicable.

Figure 13:
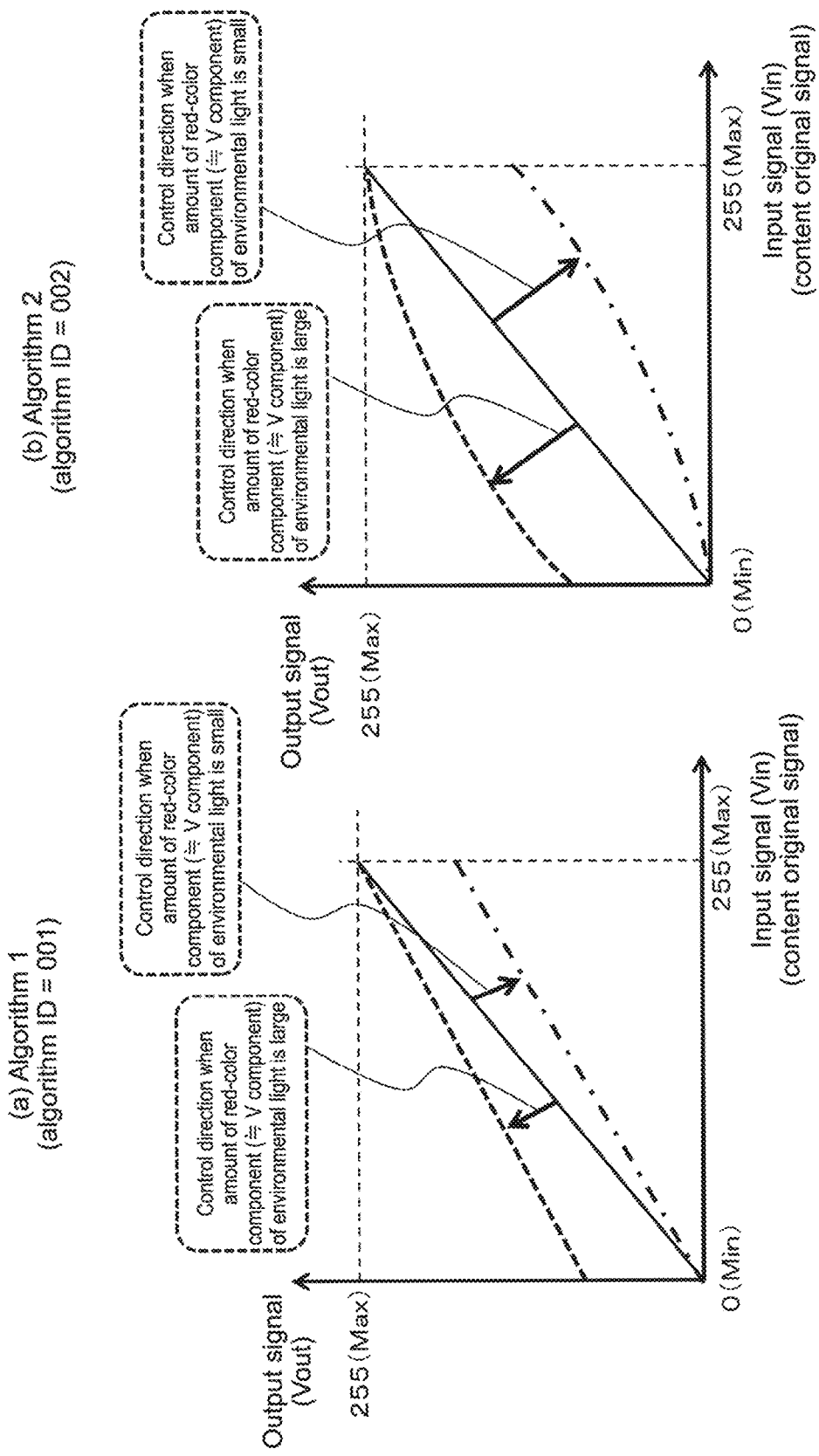
FIG. 13 Diagrams for explaining examples of the signal conversion algorithm.
Figure 14:
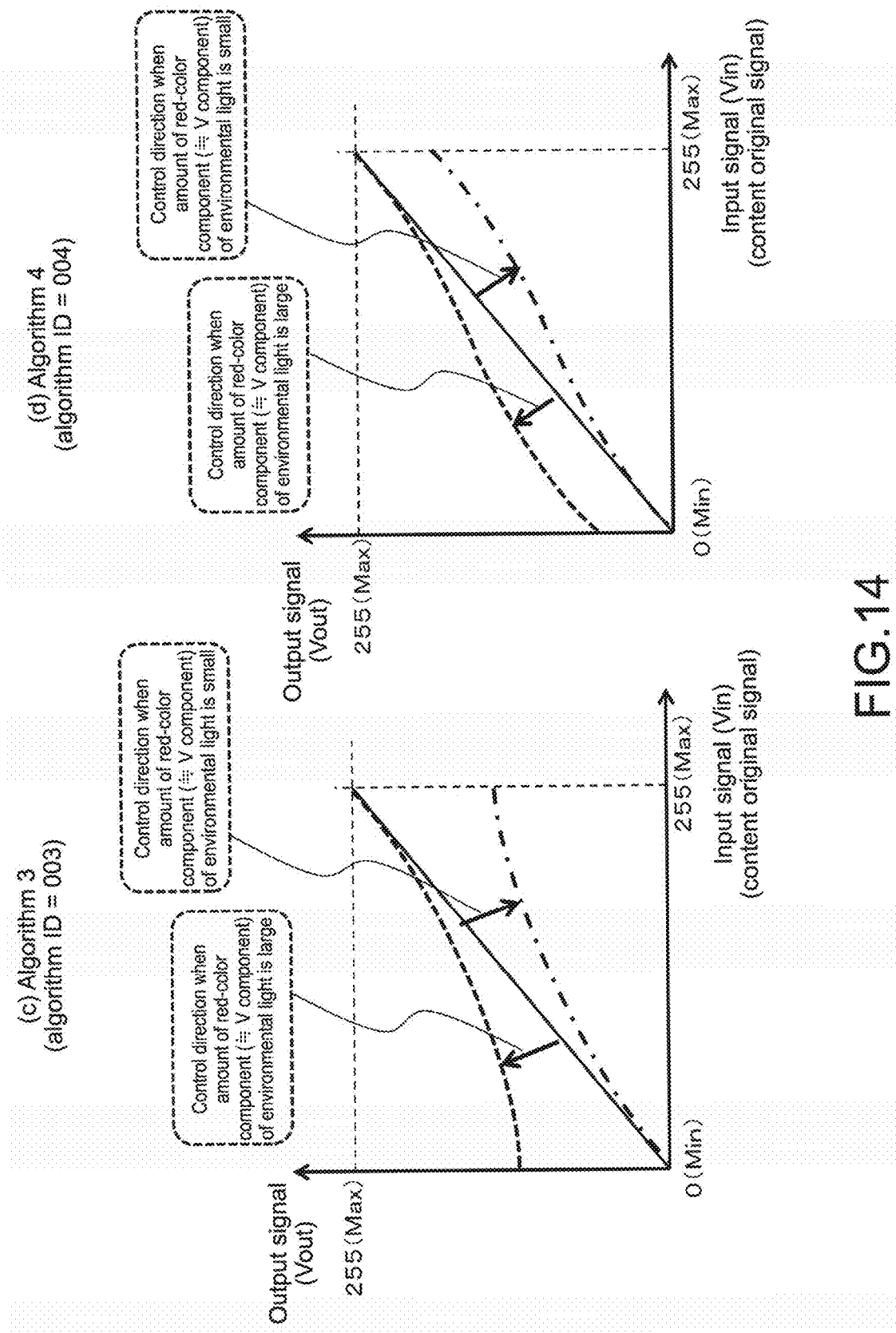
FIG. 14 Diagrams for explaining examples of the signal conversion algorithm.

FIGS. 13 and 14 show examples of the signal conversion algorithms that are applied to the color difference signal V.

FIGS. 13 and 14 show conversion examples of the color difference signal U using (a) Algorithm 1 (algorithm ID=001), (b) Algorithm 2 (algorithm ID=002), (c) Algorithm 3 (algorithm ID=003), and (d) Algorithm 4 (algorithm ID=004).

In each of the graphs, the solid line, the curved dotted line, and the curved dashed-dotted line each indicate a correspondence relationship between the input color difference signal value Vin and the output color difference signal value Vout in the following settings.

Solid line=setting in case where color difference signal value Vsns detected by environmental light sensor 31 is standard color difference signal value assumed by content producer Curved dotted line=setting in case where color difference signal value Vsns detected by environmental light sensor 31 is higher than standard color difference signal value assumed by content producer Curved dashed-dotted line=setting in case where color difference signal value Vsns detected by environmental light sensor 31 is lower than standard color difference signal value assumed by content producer The image display control apparatus (television 30) executes the signal conversion processing by applying any of the 4 signal conversion algorithms shown in FIGS. 13 and 14 according to a scene configuring a content, for example, and calculates a color difference signal value (Vout) of output image signals.

It should be noted that although the setting examples of the luminance signal conversion algorithms are shown in FIGS. 13 and 14, these are examples of a part of the signal conversion algorithms, and various other types of conversion processing are also applicable.

Furthermore, other configuration examples of the image control application will be described with reference to FIGS. 15, 16, and 17.

In the embodiment above, the YUV values of the output image signals are controlled directly. However, control is not limited to the output signal control as described above, and a configuration of carrying out the output signal adjustment processing as follows may also be taken, for example.

(a) Execute white balance adjustment processing that differs depending on scenes and environmental light (b) Execute gamma correction processing that differs depending on scenes and environmental light (c) Execute color temperature adjustment processing that differs depending on scenes and environmental light The image control application shown in FIG. 15 is a configuration example of an application that "(a) Execute white balance adjustment processing that differs depending on scenes and environmental light".

FIG. 15 shows a correspondence relationship among three pieces of data including a scene identifier, a reproduction time, and an ID (identifier) of a signal conversion algorithm to be applied.

This correspondence relationship is similar to that of the image control application (1) that has been described with reference to FIG. 5.

It should be noted that the entry

"ID (identifier) of signal conversion algorithm to be applied" shown in the image control application (3) shown in FIG. 15 is set as white balance (WB) adjustment processing algorithm designation information.

Specifically, the image control application includes a configuration in which, according to scene sections, the reproduction times of the scenes and, as signal conversion algorithms to be applied, the white balance (WB) adjustment processing algorithms and designation information thereof are recorded.

The reproduction time specifies scene start time information (begin) and scene end time information (end).

It should be noted that an image frame identifier may be recorded in place of the reproduction time.

In this example, the signal conversion algorithms to be applied to the respective scenes are white balance adjustment processing algorithms.

Settings of the white balance adjustment processing algorithms differ depending on scenes.

Moreover, parameters to be applied to the white balance adjustment processing algorithms are determined according to sensor detection values acquired by the environmental light sensor 31.

The scene-supporting white balance adjustment processing algorithms and the algorithms for determining the parameters to be applied to the white balance adjustment processing algorithms (e.g., function F) are recorded in the content-supporting image control application.

In executing the display processing of each scene, the image display control apparatus (television 30) selects the scene-supporting white balance adjustment processing algorithm and calculates the parameters to be applied to the selected scene-supporting white balance adjustment processing algorithm based on the sensor detection values.

Further, by applying the calculated parameters to the scene-supporting white balance adjustment processing algorithm, the white balance adjustment of an output image is executed to generate and display the output image.

By carrying out the processing as described above, white balance adjustments that differ depending on scenes and environmental light are executed, and a white-balance-adjusted image that satisfies a purpose of the content producer can be displayed.

Next, an image control application that "(b) Execute gamma correction processing that differs depending on scenes and environmental light" will be described with reference to FIG. 16.

The image control application shown in FIG. 16 is a configuration example of an application that "(b) Execute gamma correction processing that differs depending on scenes and environmental light".

FIG. 16 shows a correspondence relationship among three pieces of data including a scene identifier, a reproduction time, and an ID (identifier) of a signal conversion algorithm to be applied.

This correspondence relationship is similar to that of the image control application (1) that has been described with reference to FIG. 5.

It should be noted that the entry "ID (identifier) of signal conversion algorithm to be applied" shown in the image control application (3) shown in FIG. 16 is set as gamma correction processing algorithm designation information.

Specifically, the image control application includes a configuration in which, according to scene sections, the reproduction times of the scenes and, as signal conversion algorithms to be applied, the gamma correction processing algorithms and designation information thereof are recorded.

The reproduction time specifies scene start time information (begin) and scene end time information (end).

It should be noted that an image frame identifier may be recorded in place of the reproduction time.

In this example, the signal conversion algorithms to be applied to the respective scenes are gamma correction processing algorithms.

Settings of the gamma correction processing algorithms differ depending on scenes.

Moreover, parameters to be applied to the gamma correction processing algorithms are determined according to sensor detection values acquired by the environmental light sensor 31.

The scene-supporting gamma correction processing algorithms and the algorithms for determining the parameters to be applied to the gamma correction processing algorithms (e.g., function F) are recorded in the content-supporting image control application.

In executing the display processing of each scene, the image display control apparatus (television 30) selects the scene-supporting gamma correction processing algorithm and calculates the parameters to be applied to the selected scene-supporting gamma correction processing algorithm based on the sensor detection values.

Further, by applying the calculated parameters to the scene-supporting gamma correction processing algorithm, the gamma correction processing of an output image is executed to generate and display the output image.

By carrying out the processing as described above, gamma correction processing that differs depending on scenes and environmental light is executed, and an image that has been subjected to the gamma correction processing and satisfies a purpose of the content producer can be displayed.

Next, an image control application that "(c) Execute color temperature adjustment processing that differs depending on scenes and environmental light" will be described with reference to FIG. 17.

The image control application shown in FIG. 16 is a configuration example of an application that "(b) Execute color temperature adjustment processing that differs depending on scenes and environmental light".

FIG. 17 shows a correspondence relationship among three pieces of data including a scene identifier, a reproduction time, and an ID (identifier) of a signal conversion algorithm to be applied.

This correspondence relationship is similar to that of the image control application (1) that has been described with reference to FIG. 5.

It should be noted that the entry "ID (identifier) of signal conversion algorithm to be applied" shown in the image control application (3) shown in FIG. 17 is set as color temperature adjustment processing algorithm designation information.

Specifically, the image control application includes a configuration in which, according to scene sections, the reproduction times of the scenes and, as signal conversion algorithms to be applied, the color temperature adjustment processing algorithms and designation information thereof are recorded.

The reproduction time specifies scene start time information (begin) and scene end time information (end).

It should be noted that an image frame identifier may be recorded in place of the reproduction time.

In this example, the signal conversion algorithms to be applied to the respective scenes are color temperature adjustment processing algorithms.

Settings of the color temperature adjustment processing algorithms differ depending on scenes.

Moreover, parameters to be applied to the color temperature adjustment processing algorithms are determined according to sensor detection values acquired by the environmental light sensor 31.

The scene-supporting color temperature adjustment processing algorithms and the algorithms for determining the parameters to be applied to the color temperature adjustment processing algorithms (e.g., function F) are recorded in the content-supporting image control application.

In executing the display processing of each scene, the image display control apparatus (television 30) selects the scene-supporting color temperature adjustment processing algorithm and calculates the parameters to be applied to the selected scene-supporting color temperature adjustment processing algorithm based on the sensor detection values.

Further, by applying the calculated parameters to the scene-supporting color temperature adjustment processing algorithm, the color temperature adjustment processing of an output image is executed to generate and display the output image.

By carrying out the processing as described above, color temperature adjustment processing that differs depending on scenes and environmental light is executed, and an image that has been subjected to the color temperature adjustment processing and satisfies a purpose of the content producer can be displayed.

It should be noted that although the plurality of examples of the image control application have been described, it is also possible to set and apply an application having a configuration in which the various applications described above are combined.

[5. Configuration Example of Apparatus]

Next, apparatus configuration examples of the transmission apparatus such as the content server 12 and the application server 20 shown in FIG. 1 and the image display control apparatus such as the television 30 shown in FIG. 1 will be described with reference to FIGS. 18 and 19.

Figure 18:
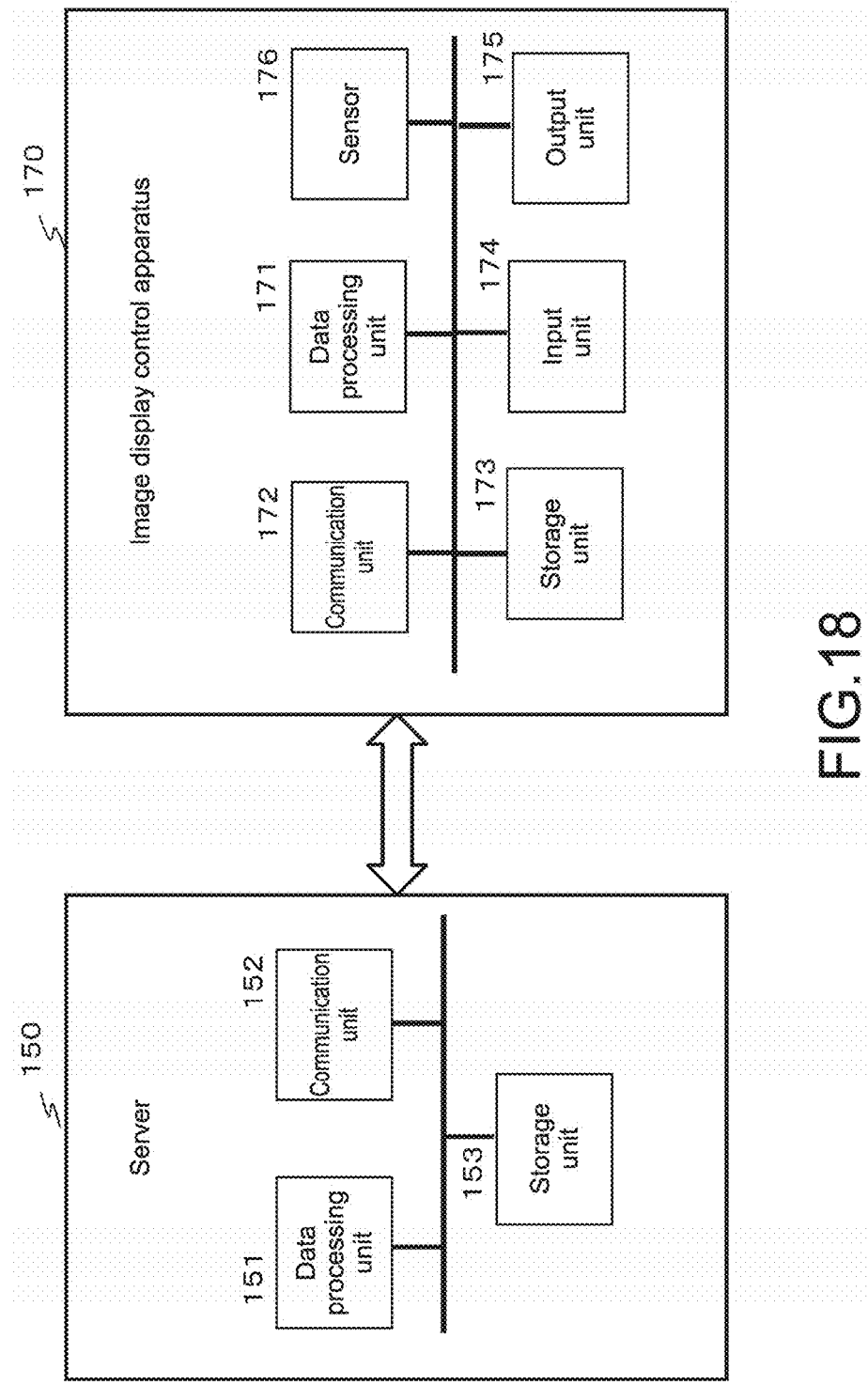
FIG. 18 A diagram for explaining configuration examples of a server and image display control apparatus.

FIG. 18 shows a configuration example of a server 150 as the transmission apparatus such as the content server 12 and the application server 20 and an image display control apparatus 170.

The server 150 includes a data processing unit 151, a communication unit 152, and a storage unit 153.

The image display control apparatus 170 includes a data processing unit 171, a communication unit 172, a storage unit 173, an input unit 174, an output unit 175, and a sensor 176.

The data processing unit 151 of the server 150 executes various types of data processing for generating and transmitting contents such as a program and content-supporting image control applications. For example, the data processing unit 151 performs generation of content configuration data, generation of content-supporting metadata, generation of a content-supporting image control application file, and transmission control of the generated data.

The communication unit 152 carries out transmission processing of the contents, metadata, and image control applications generated by the data processing unit 151, and the like.

The storage unit 153 stores the contents, metadata, image control applications, and the like to be transmitted. The storage unit 153 is also used as a working area for the data processing executed by the data processing unit 151 and as a storage area for various parameters.

On the other hand, the image display control apparatus 170 includes the data processing unit 171, the communication unit 172, the storage unit 173, the input unit 174, the output unit 175, and the sensor 176.

The communication unit 172 receives data transmitted from a broadcast station and a server, such as contents including a program, metadata, and image control applications.

The data processing unit 171 executes output control of reception contents and the like.

Specifically, an image control application is executed, an output image is controlled based on environmental light information detected by the sensor 176.

User instruction commands such as a content designation command are input via the input unit 174.

Contents are output to the output unit 175 such as a display unit and a speaker.

The storage unit 173 stores reception contents, metadata, image control application files, and the like.

The storage unit 173 is also used as a working area for the data processing executed by the data processing unit 171 and as a storage area for various parameters.

The sensor 176 detects luminance and color phase information of environmental light, such as YUV values of environmental light.

Figure 19:
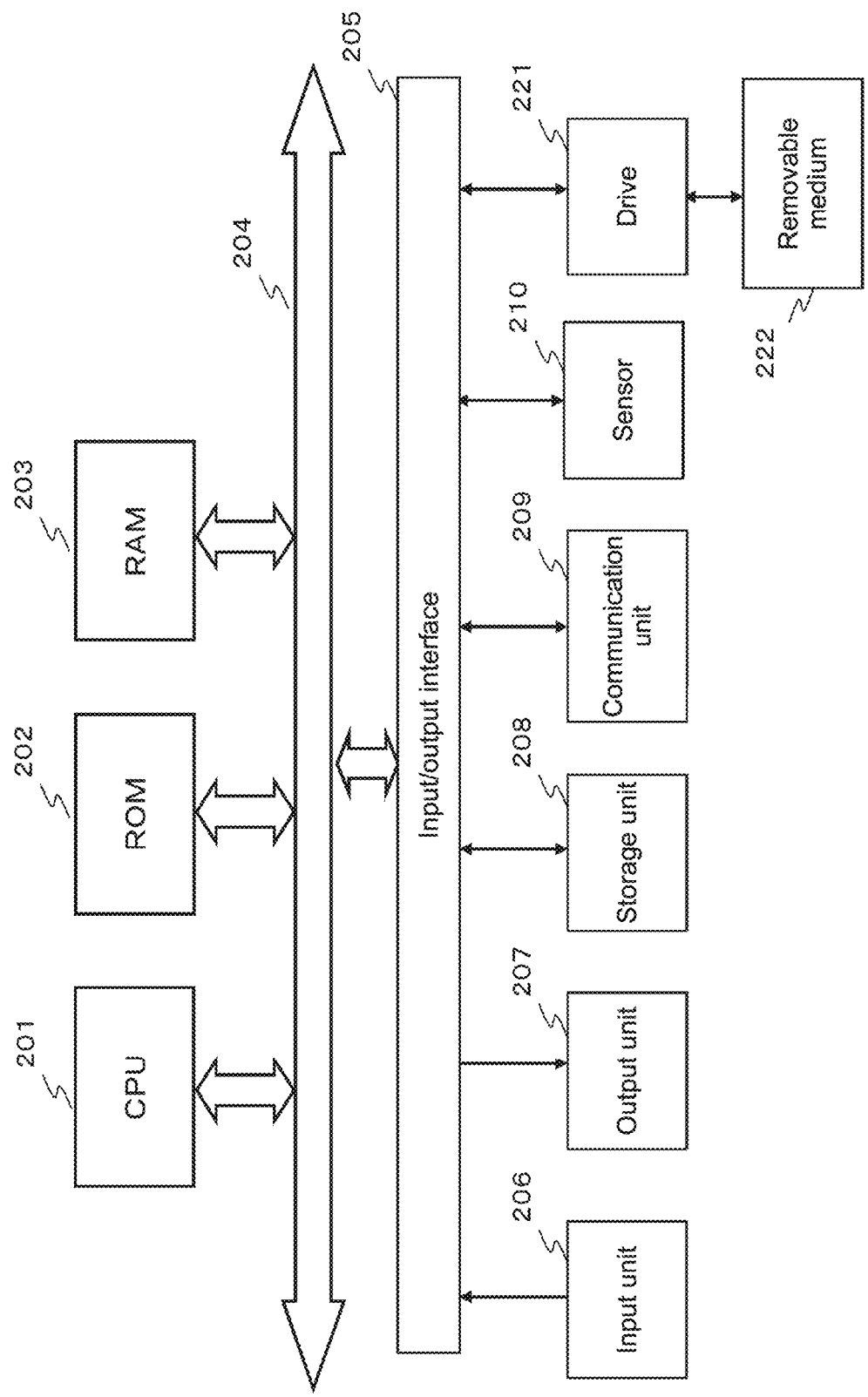
FIG. 19 A diagram for explaining a hardware configuration example of the image display control apparatus.

FIG. 19 shows a hardware configuration example of a communication apparatus applicable as the image display control apparatus 170.

The image display control apparatus can be configured by the television 30 as shown in FIG. 1. It should be noted that the apparatus needs to include a data processing unit capable of executing application programs, such as a CPU.

It should be noted that the image display control apparatus may take a configuration in which a display unit such as a television is not provided. For example, it is also possible to configure the image display control apparatus by an apparatus capable of outputting image signals to a connected display apparatus, specific examples thereof including a disc reproduction apparatus, a server apparatus, and an information processing apparatus such as a PC.

The configuration shown in FIG. 19 is one hardware configuration example of the image display control apparatus that includes the function for executing the embodiment described above.

The configuration shown in FIG. 19 will be described.

A CPU (Central Processing Unit) 201 functions as a data processing unit that executes various types of processing according to programs stored in a ROM (Read Only Memory) 202 or a storage unit 208. For example, the processing is executed according to the sequence described in the embodiment above. A RAM (Random Access Memory) 203 stores programs to be executed by the CPU 201, data, and the like. The CPU 201, the ROM 202, and the RAM 203 are mutually connected via a bus 204.

The CPU 201 is connected to an input/output interface 205 via the bus 204, and an input unit 206 constituted of various switches, a keyboard, a mouse, and a microphone and an output unit 207 constituted of a display and a speaker are connected to the input/output interface 205. The CPU 201 executes various types of processing in response to instructions input via the input unit 206 and outputs the processing results to the output unit 207, for example.

The storage unit 208 connected to the input/output interface 205 is constituted of a hard disk or the like, for example, and stores programs to be executed by the CPU 201 and various types of data. A communication unit 209 functions as a transmission/reception unit for data communication made via a network such as the Internet and a local area network and a broadcast wave transmission/reception unit, and communicates with external apparatuses.

A sensor 210 corresponds to the environmental light sensor 31 provided in the television 30 shown in FIG. 1 and acquires brightness and color phases of environmental light, that is, YUV values, for example.

A drive 221 connected to the input/output interface 205 drives a removable medium 222 such as a magnetic disk, an optical disc, a magneto-optical disc, and a semiconductor memory including a memory card and executes data recording and data reading.

[6. Conclusion of Configuration of Present Disclosure]

Heretofore, the embodiment of the present disclosure has been described with reference to the specific examples. However, it is obvious that those skilled in the art can modify or substitute the embodiment without departing from the gist of the present disclosure. Specifically, the present invention has been disclosed in the form of examples and should not be interpreted in a limited way. For determining the gist of the present disclosure, the scope of claims should be taken into consideration.

It should be noted that the technology disclosed in the specification may also take the following configurations.

(1) An image display control apparatus, including
a data processing unit that controls image signals to be output to a display unit,
the data processing unit
being configured to execute a display control application supporting a content to be displayed on the display unit to generate output image signals,
inputting sensor detection signals from a sensor that acquires environmental light information in a periphery of the display unit, and
applying the sensor detection signals and generating output image signals by carrying out signal conversion processing in which different signal conversion algorithms are applied to original input image signals of the content in a content unit, a unit of scenes configuring a content, or a frame unit.

(2) The image display control apparatus according to (1), in which
the display control application includes a configuration in which the signal conversion algorithms in a content unit, a unit of scenes configuring a content, or a frame unit are recorded, and
the data processing unit executes the signal conversion processing to which the different signal conversion algorithms are applied in an image unit specified by the display control application.

(3) The image display control apparatus according to (1) or (2), in which
the data processing unit executes, with respect to at least one of a luminance signal and a color difference signal included in the original input image signals of the content, the different signal conversion processing in a content unit, a unit of scenes configuring a content, or a frame unit, and generates a luminance signal or a color difference signal configuring the output image signals.

(4) The image display control apparatus according to any one of (1) to (3), in which the data processing unit executes, with respect to the original input image signals of the content, at least one of different white balance adjustment processing, gamma correction processing, and color temperature adjustment processing in a content unit, a unit of scenes configuring a content, or a frame unit, and generates the output image signals.

(5) The image display control apparatus according to any one of (1) to (4), in which the display control application is an application that specifies content reproduction time information and the signal conversion algorithms to be applied to image signals respectively corresponding to the reproduction times, and the data processing unit sequentially selectively applies the signal conversion algorithms specified with respect to the content reproduction times using the display control application and generates the output image signals.

(6) The image display control apparatus according to any one of (1) to (5), in which the signal conversion algorithms are algorithms whose conversion forms change according to the sensor detection signals, and the data processing unit generates output image signals that differ according to environmental light, by the signal conversion processing that differs according to the sensor detection signals.

(7) The image display control apparatus according to any one of (1) to (6), in which the data processing unit calculates parameters based on the sensor detection signals, and applies the calculated parameters to the signal conversion algorithms to generate output image signals that differ according to environmental light.

(8) The image display control apparatus according to any one of (1) to (7), in which the sensor detection signals include a luminance signal and a color difference signal, and the data processing unit calculates parameters based on the luminance signal and the color difference signal included in the sensor detection signals, and applies the calculated parameters to the signal conversion algorithms to generate output image signals that differ according to environmental light.

(9) A transmission apparatus, including a data processing unit that transmits a content to be displayed on a display unit and a display control application supporting the content via a communication unit, the display control application being an application that records a program which applies sensor detection signals for acquiring environmental light information in a periphery of the display unit and generates output image signals by carrying out signal conversion processing in which different signal conversion algorithms are applied to original input image signals of the content in a content unit, a unit of scenes configuring a content, or a frame unit.

(10) The transmission apparatus according to (9), in which the display control application is an application that records a program which executes, with respect to at least one of a luminance signal and a color difference signal included in the original input image signals of the content, the different signal conversion processing in a content unit, a unit of scenes configuring a content, or a frame unit, and generates a luminance signal or a color difference signal configuring the output image signals.

(11) The transmission apparatus according to (9) or (10), in which the display control application is an application that records a program which executes, with respect to the original input image signals of the content, at least one of different white balance adjustment processing, gamma correction processing, and color temperature adjustment processing in a content unit, a unit of scenes configuring a content, or a frame unit, and generates the output image signals.

(12) An image display control method executed in an image display control apparatus including a data processing unit that controls image signals to be output to a display unit, the image display control method including:

by the data processing unit, executing a display control application supporting a content to be displayed on the display unit to generate output image signals;

in the output image signal generation processing, inputting sensor detection signals from a sensor that acquires environmental light information in a periphery of the display unit; and applying the sensor detection signals and generating output image signals by carrying out signal conversion processing in which different signal conversion algorithms are applied to original input image signals of the content in a content unit, a unit of scenes configuring a content, or a frame unit.

(13) A program that causes an image display control apparatus to execute output image signal generation processing, the program being a display control application supporting a content to be displayed on a display unit, the program causing the image display control apparatus to execute the step of applying sensor detection signals as environmental light information in a periphery of the display unit and generating output image signals by carrying out signal conversion processing in which different signal conversion algorithms are applied to original input image signals of the content in a content unit, a unit of scenes configuring a content, or a frame unit.

It should be noted that the series of processing described in the specification can be executed either by hardware or software or by a complex configuration of them both. When executing the processing by software, it is possible to install a program recording the processing sequence in a memory of a computer incorporated into dedicated hardware and execute it, or install the program in a general-purpose computer capable of executing the various types of processing and cause the computer to execute the program. For example, the program can be recorded in advance onto a recording medium. In addition to installing from a recording medium to a computer, it is possible to receive the program via a network such as a LAN (Local Area Network) and the Internet and install it in a built-in recording medium such as a hard disk.

It should be noted that the various types of processing described in the specification may be executed not only in time series in the stated order but also in parallel or individually according to processing performance of an apparatus/apparatuses that executes/execute the processing or as necessary. Moreover, the system used in the specification is a logical group configuration of a plurality of apparatuses, and the apparatuses having the respective configurations are not necessarily provided in the same casing.

INDUSTRIAL APPLICABILITY

As described above, with the configuration according to the embodiment of the present disclosure, the apparatus and method with which signal conversion processing is executed in a content unit, a scene unit, or a frame unit according to environmental light to thus generate an output image are realized.

Specifically, provided is an image display control apparatus including a data processing unit that controls image signals to be output to a display unit, the data processing unit executing a display control application supporting a content to be displayed on the display unit to generate output image signals. The data processing unit inputs sensor detection signals from a sensor that acquires environmental light information in a periphery of the display unit, and applies the sensor detection signals and generates output image signals by carrying out signal conversion processing in which different signal conversion algorithms are applied to original input image signals of the content in a content unit, a unit of scenes configuring a content, or a frame unit.

With this configuration, the apparatus and method with which signal conversion processing is executed in a content unit, a scene unit, or a frame unit according to environmental light to thus generate an output image are realized.

REFERENCE SIGNS LIST 11 broadcast station
12 content server
20 application server
30 television
31 environmental light sensor
150 server
151 data processing unit
152 communication unit
153 storage unit
170 image display control apparatus
171 data processing unit
172 communication unit
173 storage unit
174 input unit
175 output unit
176 sensor
201 CPU
202 ROM
203 RAM
204 bus
205 input/output interface
206 input unit
207 output unit
208 storage unit
209 communication unit
210 sensor
210 drive
211 removable medium

The invention claimed is:

1. An image display control apparatus, comprising:
processing circuitry configured to:
acquire a data set that includes image signal conversion information and time information defined for a time segment of video content to which the image signal conversion information is applicable, the time information indicating a start point and an end point of the time segment of the video content;
receive a sensor detection signal from a sensor based on a brightness of an area in which the time segment of the video content is to be displayed; and
generate an output image signal from an image of the time segment of the video content based on the image signal conversion information, the sensor detection signal, and the time information.

2. The image display control apparatus according to claim 1, wherein the processing circuitry is configured to:
generate the output image signal from the image of the time segment of the video content based on at least one of a white balance adjustment, a gamma correction, or a color temperature adjustment.

3. The image display control apparatus according to claim 1, wherein the time information includes at least the start point of the time segment of the video content.

4. The image display control apparatus according to claim 1, wherein the processing circuitry is configured to receive the video content from one of a broadcast station, a content server, or a removable medium.

5. The image display control apparatus according to claim 1, wherein
the image signal conversion information includes an image signal conversion algorithm and one or more parameters, and
the processing circuitry is configured to apply the one or more parameters to the image signal conversion algorithm when the output image signal is generated from the image of the time segment of the video content.

6. The image display control apparatus according to claim 1, wherein the image signal conversion information and the time information are acquired from configuration information of the video content.

7. An image display control method, comprising:
acquiring, by processing circuitry of an image display control apparatus, a data set that includes image signal conversion information and time information defined for a time segment of video content to which the image signal conversion information is applicable, the time information indicating a start point and an end point of the time segment of the video content;
receiving, by the processing circuitry, a sensor detection signal from a sensor based on a brightness of an area in which the time segment of the video content is to be displayed; and
generating, by the processing circuitry, an output image signal from an image of the time segment of the video content based on the image signal conversion information, the sensor detection signal, and the time information.

8. The image display control method according to claim 7, wherein the generating comprises:
generating the output image signal from the image of the time segment of the video content based on at least one of a white balance adjustment, a gamma correction, or a color temperature adjustment.

9. The image display control method according to claim 7, wherein the time information includes at least the start point of the time segment of the video content.

10. The image display control method according to claim 7, further comprising:
receiving the video content from one of a broadcast station, a content server, or a removable medium.

11. The image display control method according to claim 7, wherein
the image signal conversion information includes an image signal conversion algorithm and one or more parameters, and
the generating includes applying the one or more parameters to the image signal conversion algorithm when the output image signal is generated from the image of the time segment of the video content.

12. The image display control method according to claim 7, wherein the image signal conversion information and the time information are acquired from configuration information of the video content.

13. A non-transitory computer-readable storage medium storing instructions which when executed by a computer cause the computer to perform an image display control method, the image display control method comprising:
acquiring a data set that includes image signal conversion information and time information defined for a time segment of video content to which the image signal conversion information is applicable, the time information indicating a start point and an end point of the time segment of the video content;
receiving a sensor detection signal from a sensor based on a brightness of an area in which the time segment of the video content is to be displayed; and
generating an output image signal from an image of the time segment of the video content based on the image signal conversion information, the sensor detection signal, and the time information.

14. The non-transitory computer-readable storage medium according to claim 13, wherein the generating comprises:
generating the output image signal from the image of the time segment of the video content based on at least one of a white balance adjustment, a gamma correction, or a color temperature adjustment.

15. The non-transitory computer-readable storage medium according to claim 13, wherein the time information includes at least the start point of the time segment of the video content.

16. The non-transitory computer-readable storage medium according to claim 13, wherein the image display control method further comprises:
receiving the video content from one of a broadcast station, a content server, or a removable medium.

17. The non-transitory computer-readable storage medium according to claim 13, wherein
the image signal conversion information includes an image signal conversion algorithm and one or more parameters, and
the generating includes applying the one or more parameters to the image signal conversion algorithm when the output image signal is generated from the image of the time segment of the video content.

18. The non-transitory computer-readable storage medium according to claim 13, wherein the image signal conversion information and the time information are acquired from configuration information of the video content.

* * * * *